(12) United States Patent
Dan-Jumbo et al.

(10) Patent No.: US 8,936,694 B1
(45) Date of Patent: *Jan. 20, 2015

(54) HIGH TEMPERATURE HYBRIDIZED MOLECULAR FUNCTIONAL GROUP ADHESION BARRIER COATING AND METHOD

(75) Inventors: Eugene A. Dan-Jumbo, Bothell, WA (US); Joel P. Baldwin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/421,838

(22) Filed: Mar. 15, 2012

Related U.S. Application Data

(63) Continuation-in-part of application No. 13/069,373, filed on Mar. 22, 2011, now Pat. No. 8,764,929.

(51) Int. Cl.
| | |
|---|---|
| *B29C 65/00* | (2006.01) |
| *B31B 1/60* | (2006.01) |
| *B32B 37/00* | (2006.01) |
| *B32B 38/00* | (2006.01) |
| *B23P 17/04* | (2006.01) |
| *B21D 39/03* | (2006.01) |
| *B23P 11/00* | (2006.01) |
| *B23P 19/04* | (2006.01) |

(52) U.S. Cl.
USPC ............. 156/281; 156/285; 156/286; 156/60; 29/592; 29/428; 29/460

(58) Field of Classification Search
USPC ............. 156/281, 60, 285, 286; 29/592, 428, 29/460
See application file for complete search history.

(56) References Cited

U.S. PATENT DOCUMENTS

| | | | |
|---|---|---|---|
| 3,657,046 A * | 4/1972 | Furukawa et al. ............ 156/315 |
| 4,359,493 A * | 11/1982 | Henery .................... 427/255.25 |
| 6,022,416 A * | 2/2000 | Olson ........................... 118/726 |
| 6,770,371 B2 | 8/2004 | Stephenson et al. | |
| 7,713,347 B2 | 5/2010 | Krienke | |
| 2006/0051605 A1* | 3/2006 | Wang et al. .................. 428/522 |
| 2007/0281126 A1* | 12/2007 | Lahann et al. .................. 428/98 |
| 2010/0113264 A1* | 5/2010 | Tsurumi et al. ............... 502/402 |
| 2012/0244360 A1* | 9/2012 | Dan-Jumbo et al. .......... 428/413 |

OTHER PUBLICATIONS

Wikipedia, Definition of "Covalent bond", 4 pages, available at <http://en.wikipedia.org/w/index.php?title=Covalent_bond &printable=yes>, last visited Mar. 20, 2011.
Wikipedia, Definition of "Derivatization", 2 pages, available at <http://en.wikipedia.org/w/index.php?title=Derivatization &printable=yes>, last visited Mar. 20, 2011.
Wikipedia, Definition of "Functional group", 8 pages, available at <http://en.wikipedia.org/w/index.php?title=Functional_group &printable=yes>, last visited Mar. 20, 2011.
Wikipedia, Definition of "Van der Waal force", 5 pages, available at <http://en.wikipedia.org/w/index.php?title=Van_der_Waals_ force&printable=yes>, last visited Mar. 20, 2011.

* cited by examiner

*Primary Examiner* — Richard Crispino
*Assistant Examiner* — Matthew Hoover

(57) ABSTRACT

The disclosure provides in one embodiment a method of applying a high temperature hybridized molecular functional group adhesion barrier coating to a surface of a structure. The method includes providing a structure having at least one surface to be bonded, preparing the at least one surface to expose active reactive surface sites, providing one or more liquid or solid phase chemical derivatization compounds, applying heat to the one or more liquid or solid phase chemical derivatization compounds to vaporize the one or more liquid or solid chemical derivatization compounds, depositing the one or more vaporized chemical derivatization compounds on the prepared surface to form a derivatized composite surface having hybridized molecular functional groups, and heat curing the derivatized composite surface to form a high temperature hybridized molecular functional group adhesion barrier coating.

16 Claims, 32 Drawing Sheets

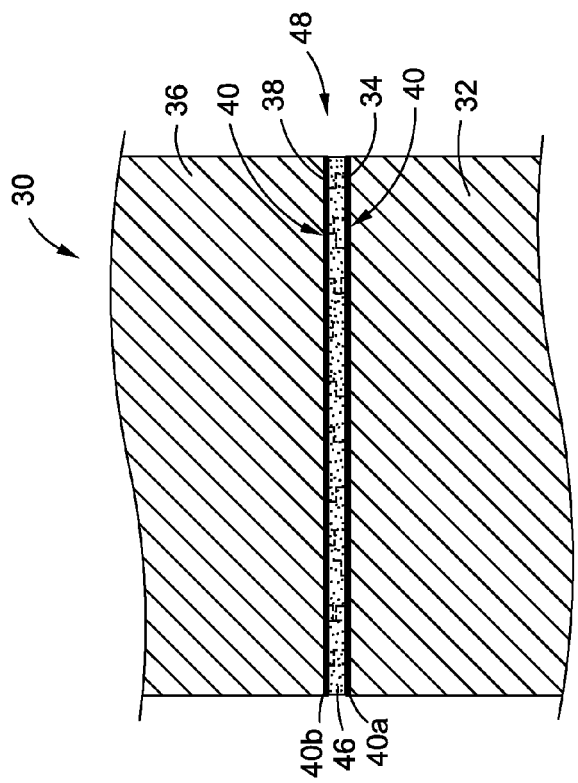
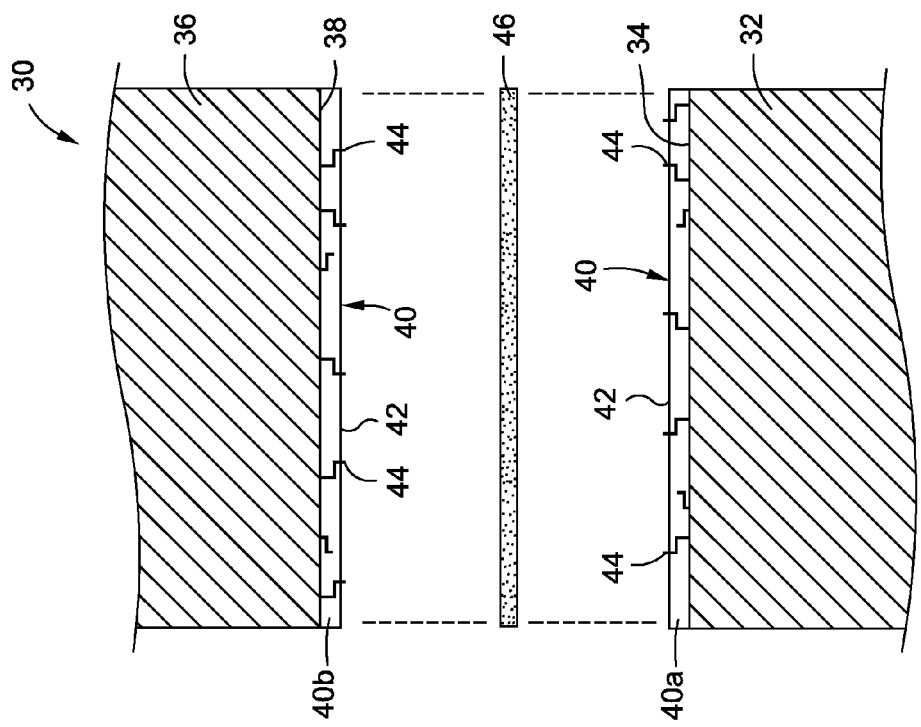

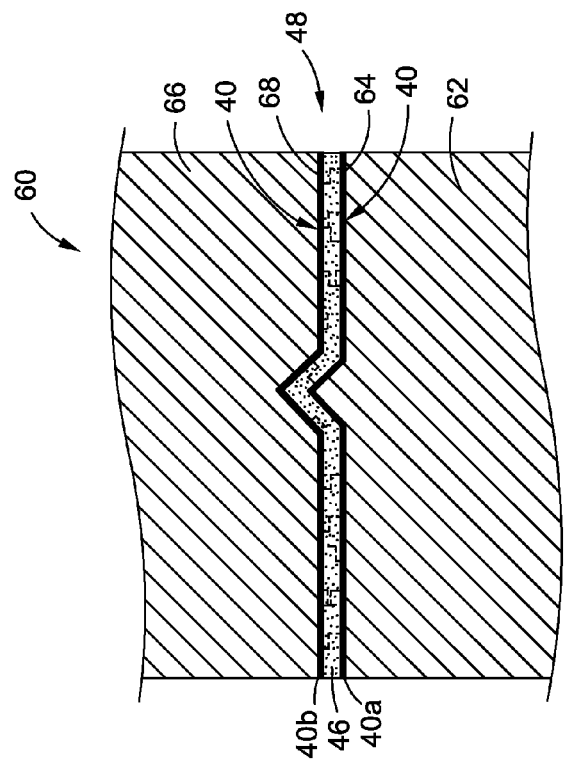
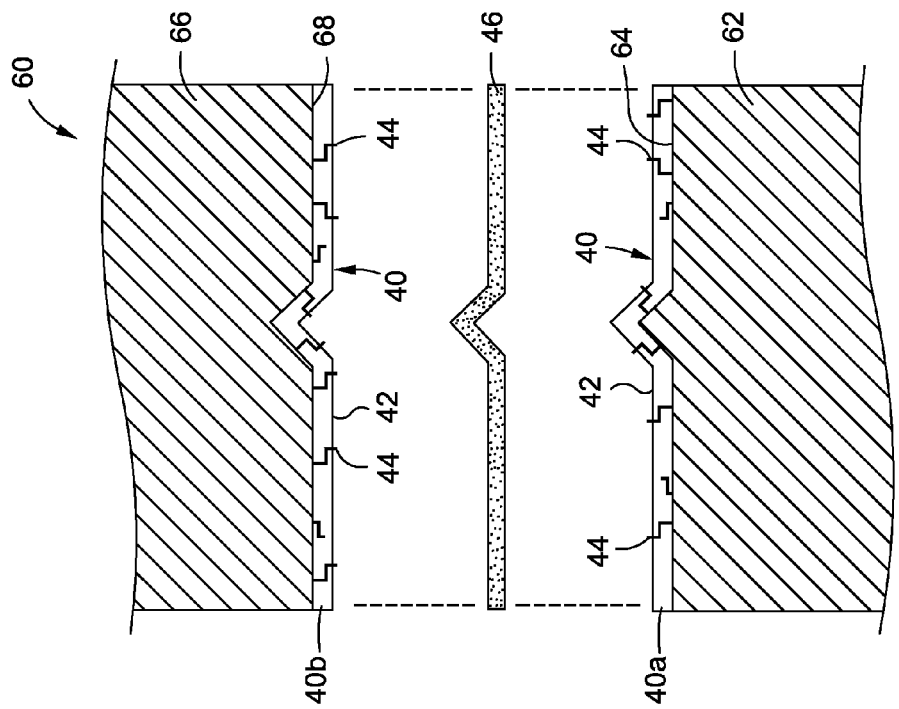

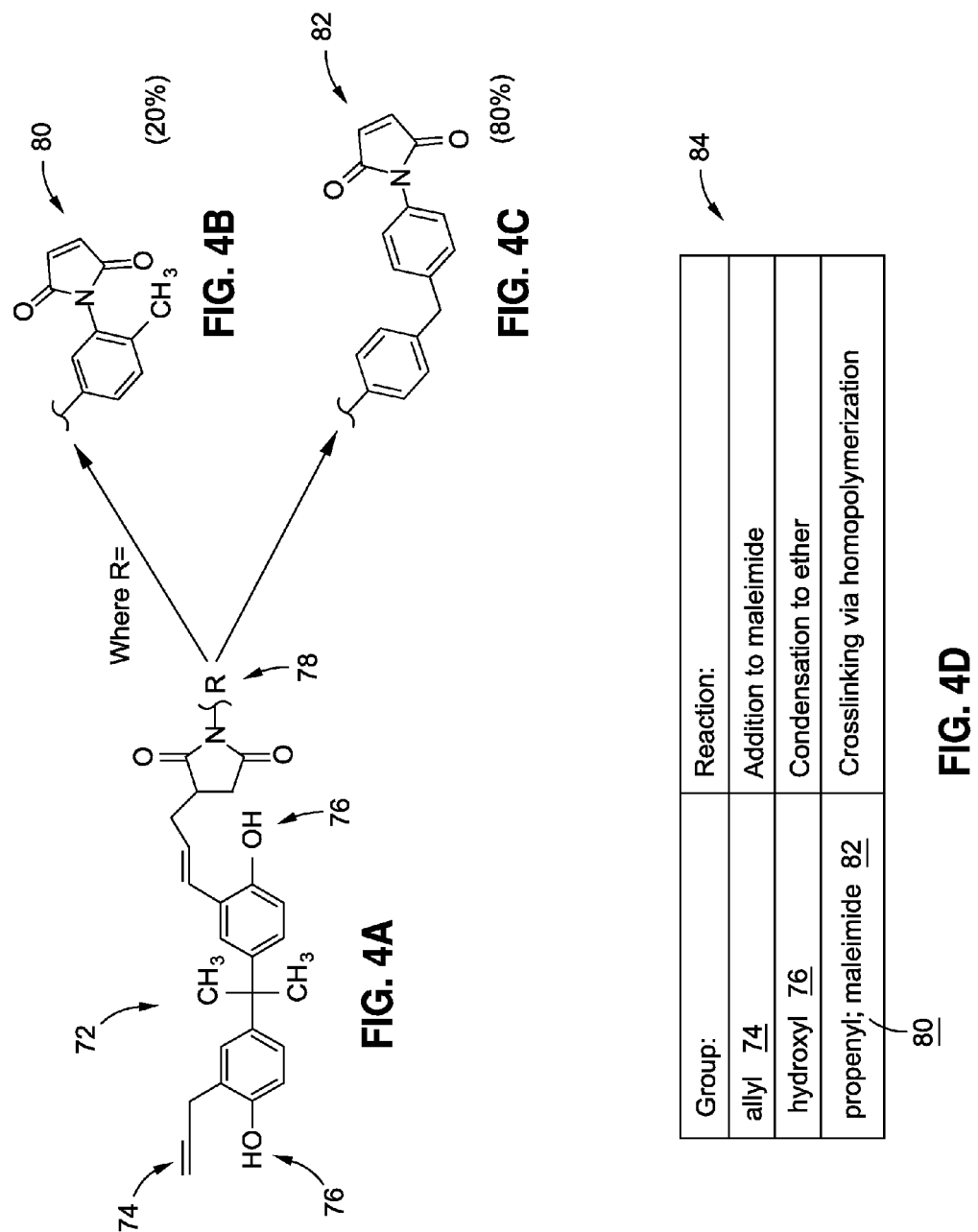

Pentafluorophenol (hydroxyl)

Allyl pentafluorobenzene (allyl)

Tridecafluorononyl maleimide (maleimide)

Glycidyloctafluoropentyl ether (epoxy)

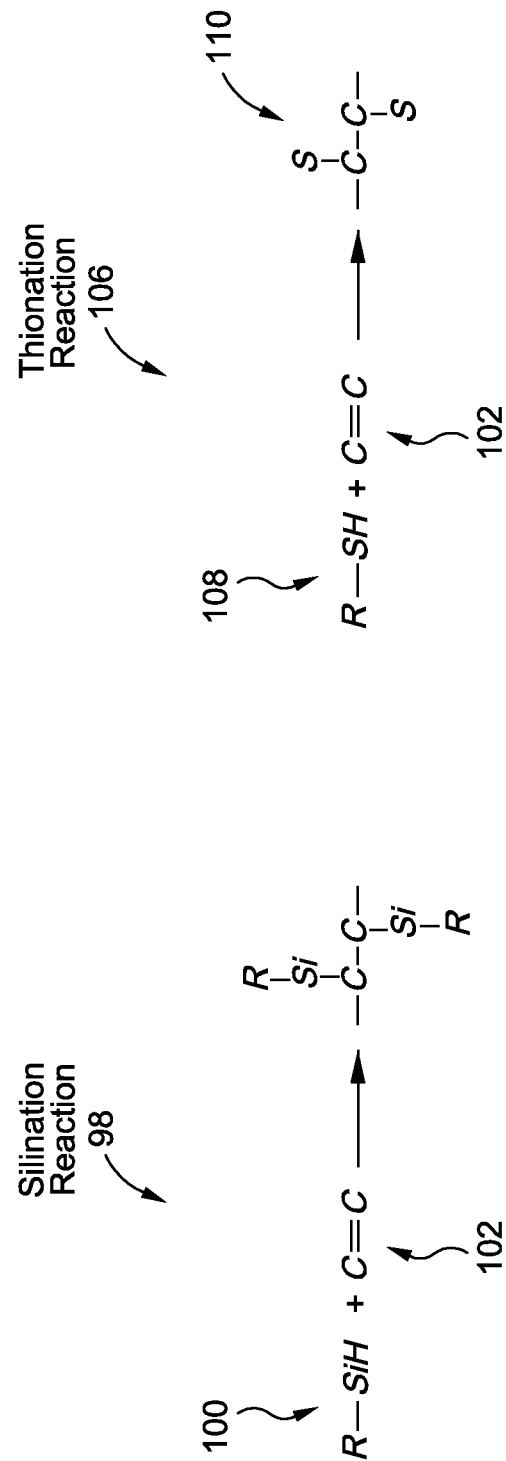

Potential BMI adhesion reactions ─ 112

| Group | Type | Possible reactions with BMI / epoxy adhesive | Temperature range (°C) |
|---|---|---|---|
| 1 | Allyl 74 | Ene addition to maleimide | 200°C - 300°C |
| 2 | Hydroxyl 76 | Etherification | >240°C |
| 2 | Hydroxyl-epoxide | Epoxy addition | >100°C |
| 3 | Maleimide 82 | Maleimide addition to maleimide | >100°C |

FIG. 9

Atomic Compositions

| Element | None/Control | Pentafluoro phenol | Allyl Pentafluoro benzene | Tridecafluorononyl Maleimide | Glycidyl Octafluoropentyl Ether |
|---|---|---|---|---|---|
| | | | Relative Atomic % | | |
| Fluorine | 2.5 | 8.6 | 4.7 | 15.3 | 8.9 |
| Oxygen | 17 | 18.1 | 22.8 | 16 | 14.6 |
| Carbon | 75.2 | 68.4 | 58 | 61.4 | 70.9 |
| Silicon | 0 | 1 | 14.6 | 2.1 | 0 |
| Nitrogen | 5.3 | 3.8 | 0 | 5.2 | 5.6 |

FIG. 24

Atomic Compositions

| Element | Relative Atomic % | |
|---|---|---|
| | Epoxy Derivatized | BMI Derivatized |
| Fluorine | 7.4 | 7.1 |
| Oxygen | 13.5 | 15.5 |
| Nitrogen | 6.5 | 4.6 |
| Carbon | 71.6 | 72.7 |
| Sulfur | 1.0 | 0.0 |

FIG. 25

Effect of Derivatization on Surface Energy

| Derivatizing agent: | Bonds to: | $\gamma^T$ (mJ/m$^2$) | $\gamma^P$ (mJ/m$^2$) |
|---|---|---|---|
| None | | 35.5 | 2.7 |
| Pentafluorophenol | Hydroxyl | 35.8 | 1.5 |
| Allyl Pentafluorobenzene | Maleimide | 40.8 | 0.02 |
| Tridecafluorononyl Maleimide | Allyl | 24.3 | 5.7 |
| Glycidyl Octafluoropentyl Ether | Hydroxyl | 37.1 | 2.4 |

FIG. 26

Surface Characterization

| Surface | Surface Energy, mJ/m² | | |
|---|---|---|---|
| | Dispersive | Polar | Total |
| Epoxy Control | 41.8 | 3.0 | 44.8 |
| Epoxy Derivatized | 29.6 | 5.9 | 35.5 |
| BMI Control | 46.6 | 2.1 | 48.7 |
| BMI Derivatized | 44.9 | 0.9 | 45.9 |

FIG. 27

Reactive Surface Sites on BMI

| Derivatizing agent: | Bonds to: | %F (Corrected) | Active surface sites/100 atoms |
|---|---|---|---|
| Pentafluorophenol | Hydroxyl | 6.1 | 1.2 |
| Allyl Pentafluorobenzene | Maleimide | 2.2 | 0.4 |
| Tridecafluorononyl Maleimide | Allyl | 12.5 | 1.0 |
| Glycidyl Octafluoropentyl Ether | Hydroxyl | 6.4 | 0.8 |

FIG. 28

HIGH TEMPERATURE HYBRIDIZED MOLECULAR FUNCTIONAL GROUP ADHESION BARRIER COATING AND METHOD

CROSS-REFERENCE TO RELATED APPLICATIONS

This application is a continuation-in-part application of pending U.S. Non-Provisional patent application Ser. No. 13/069,373, filed on Mar. 22, 2011, and entitled "METHOD OF PROMOTING ADHESION AND BONDING OF STRUCTURES AND STRUCTURES PRODUCED THEREBY", which is incorporated herein by reference in its entirety.

BACKGROUND

1) Field of the Disclosure

The disclosure relates generally to methods for bonding of structures, and more particularly, to methods for promoting adhesion and bonding of composite and metal structures, and the bonded structures produced thereby, such as for use in aircraft, spacecraft, and other vehicles and structures. Further, this disclosure relates generally to barrier coatings and methods for application of barrier coatings, and more particularly, to high temperature adhesion barrier coatings and methods for application of such high temperature adhesion barrier coatings.

2) Description of Related Art

Composite and metal structures or component parts are used in a wide variety of applications, including in the manufacture of aircraft, spacecraft, rotorcraft, watercraft, automobiles, trucks, and other vehicles and structures. In particular, in aircraft construction, structures or component parts, such as composite structures or component parts, are used in increasing quantities to form the fuselage, wings, tail section, and other component parts of the aircraft. Such large-sized structural aircraft components may be manufactured by bonding together composites to composites, composites to metals, and metals to metals.

Known methods and systems for bonding composite and metal component parts together, such as aircraft component parts, typically involve using fastener devices, such as bolts, screws, pins, or other fastener devices to secure the component parts together. However, using such known fastener devices can add to the overall weight of the aircraft, which can, in turn, increase fuel costs. Further, using such known fastener devices can take time and labor to install and can require procurement and storage of the fastener devices, which can, in turn, increase installation, labor, and manufacturing costs.

In addition, known methods and systems for bonding composite and metal component parts together, such as aircraft component parts, typically also involve using film adhesives to join or bond two composite materials together, two metal materials together, or a composite material to a metal material. In order to form the large-sized structural component, the components are firstly positioned and aligned with respect to one another on a suitable supporting structure, in accordance with previously known methods. The adhesive films are typically applied in advance between the components which are to be adhesively bonded to one another. To improve structural bonding, known methods exist for modifying the surface of the composite or metal structure or part prior to applying the adhesive. Known surface modification methods may require the roughening of the composite or metal surface via sanding or grit blasting. Such known procedures can create some active oxide functional groups on the surface. However, it is believed that no known methods or systems exist for durable surface modification for improved structural bonding and for identifying functional groups which have an affinity to enhance durable and sustainable structural bonding and thereby improve secondary bonding forces (Van der Waals forces) and which can, in turn, increase the durable, long-term life of a composite bonded joint.

In addition, high temperature barrier coatings for composite and metal structures are known. Such known high temperature barrier coatings may comprise primers for structures. However, such primers may form thick films, such as thick adhesion promoters or corrosion prevention layers, which may be more sensitive to the thickness of the deposited film and may be too thick, and which may, in turn, affect mechanical performance of the structure. Moreover, such primers may form films that may be too thin, and which may, in turn, cause the film to be ineffective.

Attempts at durable high temperature surface modification for improved high temperature structural adhesion barrier coatings under hostile operating environments have been made. For example, typical known processes require the roughening of the composite or metallic surface via sanding or grit blasting to mitigate possible exfoliation. However, such processes may create some active oxide on the surface but not to the extent that the oxide groups themselves affect the thermal oxidative stability (TOS) of the structural members.

Moreover, attempts have been made to produce high temperature barrier coatings that can provide adhesion promotion for structural bonding and minimize thermal oxidative degradation. However, such attempts may impact structure life, damage tolerance, and durability, and may not sustain the structure under high temperature, hostile operating environments.

Accordingly, there is a need in the art for methods and systems for promoting adhesion and bonding of composite and metal structures that provide advantages over known methods and systems. Moreover, there is a need in the art for high temperature adhesion barrier coatings and methods that provide advantages over known coatings and methods.

SUMMARY

This need for methods and systems for promoting adhesion and bonding of composite and metal structures is satisfied. Moreover, this need for high temperature adhesion barrier coatings and methods is satisfied. As discussed in the below detailed description, embodiments of the methods and systems may provide significant advantages over existing methods, coatings, systems, and devices.

In an embodiment of the disclosure, there is provided a method of promoting adhesion on a composite surface. The method comprises providing a composite structure having at least one composite surface to be bonded. The method further comprises preparing the at least one composite surface. The method further comprises providing a chemical derivatization compound containing active functional groups that promote adhesion. The method further comprises depositing the chemical derivatization compound on the prepared composite surface to form a functional group-adhesive promoter derivatized layer. The method further comprises applying an adhesive layer to the derivatized layer. The method further comprises heat curing the adhesive layer to result in a bond with another structure made of a composite, a metal, or a combination thereof.

In another embodiment of the disclosure, there is provided a method for structural bonding of structures. The method comprises providing a first structure made of a composite material and a second structure made of a composite material, a metal, or a combination thereof. The method further comprises preparing a surface to be bonded on each of the first and second structures to form a first prepared surface and a second prepared surface. The method further comprises providing a chemical derivatization compound containing active functional groups that promote adhesion. The method further comprises depositing the chemical derivatization compound on each of the first and second prepared surfaces to form a first functional group-adhesive promoter derivitized layer and a second functional group-adhesive promoter derivitized layer. The method further comprises applying an adhesive layer to at least one of the derivitized layer of the first and second functional group-adhesive promoter derivitized layer. The method further comprises joining the first and second structures together with the adhesive layer and the first and second functional group-adhesive promoter derivitized layer therebetween. The method further comprises heat curing the adhesive to the joined first and second structures to form a structural bond between the first and second structures.

In another embodiment of the disclosure, there is provided a method for structural bonding of polymeric composite structures of an aircraft. The method comprises providing a first polymeric composite aircraft structure and a second polymeric composite aircraft structure. The method further comprises preparing a surface to be bonded on each of the first and second polymeric composite aircraft structures to form a first prepared surface and a second prepared surface. The method further comprises providing a chemical derivatization compound containing active functional groups that promote adhesion. The method further comprises depositing the chemical derivatization compound on each of the first and second prepared surfaces to form a first functional group-adhesive promoter derivitized layer and a second functional group-adhesive promoter derivitized layer. The method further comprises applying an adhesive layer to at least one of the first and second functional group-adhesive promoter derivitized layers. The method further comprises joining the first and second polymeric composite aircraft structures together with the adhesive layer and the first and second functional group-adhesive promoter derivitized layers therebetween. The method further comprises heat curing the adhesive layer to the joined first and second polymeric composite aircraft structures to form a structural bond between the first and second polymeric composite aircraft structures.

In another embodiment of the disclosure, there is provided a method of applying a high temperature hybridized molecular functional group adhesion barrier coating to a surface of a structure. The method comprises providing a structure having at least one surface to be bonded. The method further comprises preparing the at least one surface to expose active reactive surface sites. The method further comprises providing one or more liquid or solid phase chemical derivatization compounds. The method further comprises applying heat to the one or more liquid or solid phase chemical derivatization compounds to vaporize the one or more liquid or solid phase chemical derivatization compounds. The method further comprises depositing the one or more vaporized chemical derivatization compounds on the prepared surface to form a derivatized composite surface having hybridized molecular functional groups. The method further comprises heat curing the derivatized composite surface to form a high temperature hybridized molecular functional group adhesion barrier coating.

In another embodiment of the disclosure, there is provided a method of applying a high temperature hybridized molecular functional group adhesion barrier coating to a surface of a composite structure. The method comprises preparing a composite surface of a composite structure to expose active reactive surface sites. The method further comprises positioning the composite structure in a derivatization chamber. The method further comprises positioning one or more liquid or solid phase chemical derivatization compounds in the derivatization chamber. The method further comprises sealing the derivatization chamber. The method further comprises applying heat to the one or more liquid or solid phase chemical derivatization compounds to vaporize the one or more liquid or solid phase chemical derivatization compounds. The method further comprises flowing the one or more vaporized chemical derivatization compounds over the prepared composite surface. The method further comprises depositing the one or more vaporized chemical derivatization compounds on the prepared composite surface to form a derivatized composite surface having hybridized molecular functional groups. The method further comprises heat curing at an effective curing heat temperature for an effective curing heat time the derivatized composite surface to form a high temperature hybridized molecular functional group adhesion barrier coating. The method further comprises cooling the derivatized composite surface with the formed high temperature hybridized molecular functional group barrier coating.

In another embodiment of the disclosure, there is provided a high temperature hybridized molecular functional group adhesion barrier coating for a composite structure. The coating comprises one or more hybridized molecular functional groups attached to a composite surface of a composite structure, wherein the one or more hybridized molecular functional groups are hybridized through a chemical derivatization process. The coating further comprises one or more chemical derivatization compounds attached to the one or more hybridized molecular functional groups via a condensation reaction. The coating is preferably resistant to high heat temperatures in a range of from about 350 degrees Fahrenheit to about 2000 degrees Fahrenheit, and the coating is preferably a thermally protective, toughened adhesion coating that mitigates effects of a hostile operating environment.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2A is an illustration of a partial cross-sectional exploded view of an embodiment of a bonded structure made with one of the embodiments of the methods disclosed herein;

FIG. 2B is an illustration of a partial cross-sectional view of the bonded structure of FIG. 2A;

FIG. 3A is an illustration of a partial cross-sectional exploded view of an embodiment of a repair bonded structure made with one of the embodiments of the methods disclosed herein;

FIG. 3B is an illustration of a partial cross-sectional view of the repair bonded structure of FIG. 3A;

FIG. 4A is an illustration of the chemical structure of a bismaleimide prepolymer and its functional groups;

FIG. 4B is an illustration of the chemical structure of a first R group for the bismaleimide prepolymer of FIG. 4A;

FIG. 4C is an illustration of the chemical structure of a second R group for the bismaleimide prepolymer of FIG. 4A;

FIG. 4D is an illustration of a table listing the functional groups of the bismaleimide prepolymer of FIG. 3A and the reactions of the functional groups;

FIG. 7 is an illustration of a silination derivatization reaction mechanism that may be used in embodiments of the methods disclosed herein;

FIG. 8 is an illustration of a thionation derivatization reaction mechanism that may be used in embodiments of the methods disclosed herein;

FIG. 9 is an illustration of a table listing the potential bismaleimide adhesion reactions;

FIG. 24 is an illustration of a table listing atomic compositions of model chemical derivatization compounds deposited on a BMI surface;

FIG. 25 is an illustration of a table listing atomic compositions of elements of model chemical derivatization compounds deposited on an epoxy derivatized surface and on a BMI derivatized surface;

FIG. 26 is an illustration of a table listing the effect of derivatization on surface energy for various derivatizing agents;

FIG. 27 is an illustration of a table listing surface characterization for surface energy of epoxy and BMI control and derivatized surfaces;

FIG. 28 is an illustration of a table listing reactive surface sites on BMI for various derivatizing agents;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
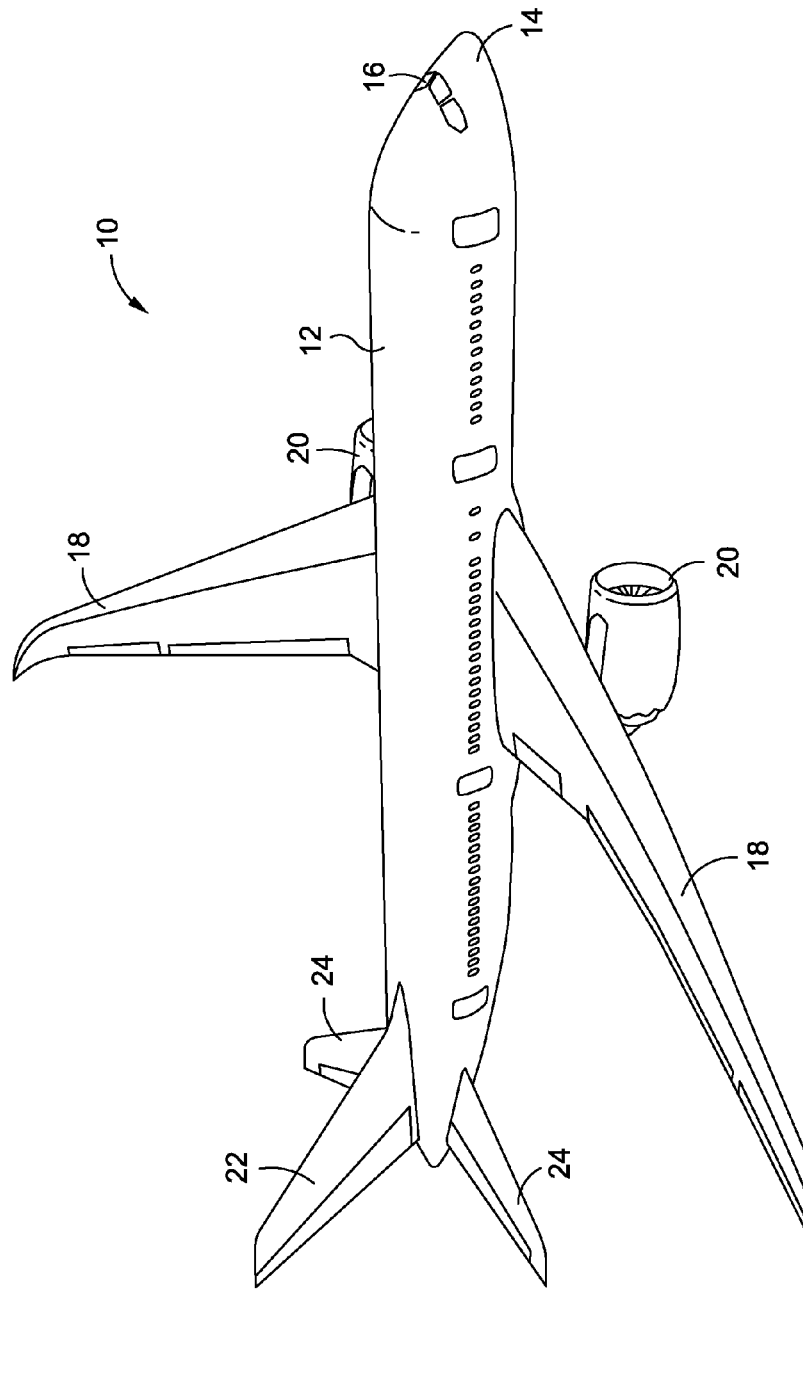
FIG. 1 is an illustration of a perspective view of an exemplary aircraft for which embodiments of the methods and structures made with the methods may be used.

Now referring to the Figures, FIG. 1 is an illustration of a perspective view of an exemplary prior art aircraft 10 for which embodiments of methods 150 (see FIG. 18), 200 (see FIG. 19), 300 (see FIG. 20), and structurally bonded structures 30 (see FIGS. 2A, 2B), 50 (see FIGS. 2C, 2D), and 170 (see FIGS. 2E, 2F), and repair bonded structure 60 (see FIGS. 3A, 3B) made from such methods 150, 200, 300, may be used.

As shown in FIG. 1, the aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the methods 150, 200, 300, and structurally bonded structures 30 (see FIGS. 2A, 2B), 50 (see FIGS. 2C, 2D), and repair bonded structure 60 (see FIGS. 3A, 3B) made from such methods 150, 200, 300, as disclosed herein, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of methods, systems, and apparatuses in accordance with the disclosure may be utilized in other vehicles, such as boats and other watercraft, trains, automobiles, trucks, and buses, as well as buildings and other architectural structures that use composite and metal structural components.

In one of the embodiments there is provided a bonded structure 30 (see FIGS. 2A, 2B) that may be formed or made with embodiments of the methods 150, 200, 300 disclosed herein. FIG. 2A is an illustration of a partial cross-sectional exploded view of an exemplary embodiment of a bonded structure 30 that may be made with embodiments of the methods 150, 200, 300 disclosed herein. FIG. 2B is an illustration of a partial cross-sectional view of the bonded structure 30 of FIG. 2A. Preferably, the bonded structure 30 is a composite bonded structure comprising a first composite structure or substrate 32 having a first composite surface 34 to be bonded and a second composite structure or substrate 36 having a second composite surface 38 to be bonded. As discussed in detail below, the first composite surface 34 and/or the second composite surface 38 are prepared or treated with a surface preparation treatment or process prior to structural bonding. The first and second composite structures 32, 36 are made of a polymeric composite material comprising preferably, one or more of bismaleimides (BMI), epoxies, or another suitable polymeric composite material; more preferably, graphite (Gr)/bismaleimide, graphite (Gr)/epoxy, or graphite (Gr)/polyimide; and most preferably, graphite (Gr)/bismaleimide (BMI).

Figure 2D:
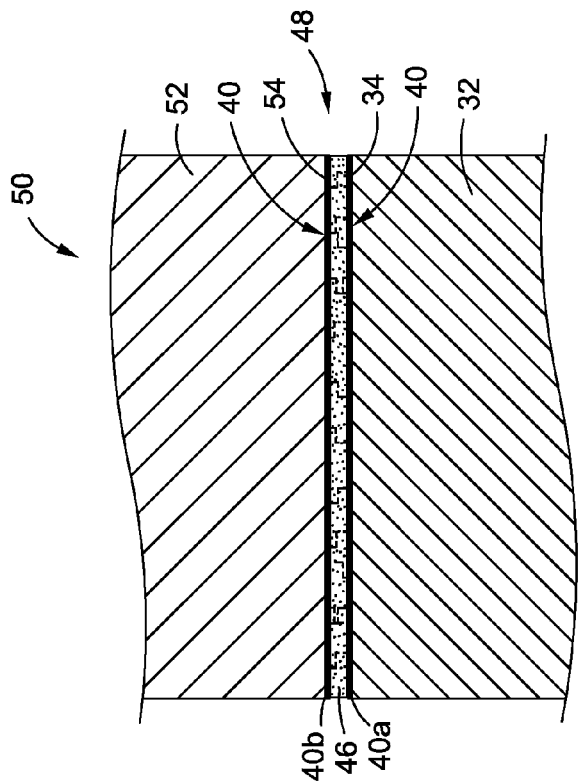
FIG. 2D is an illustration of a partial cross-sectional view of the bonded structure of FIG. 2C.
Figure 2C:
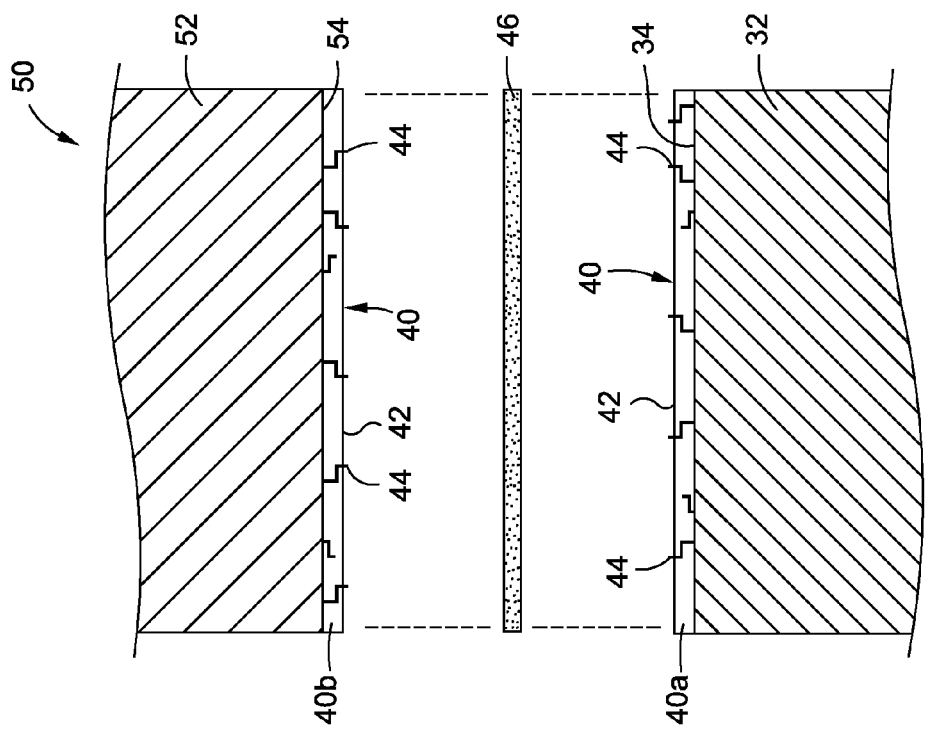
FIG. 2C is an illustration of a partial cross-sectional exploded view of another embodiment of a bonded structure made with one of the embodiments of the methods disclosed herein.

In another one of the embodiments there is provided a bonded structure 50 (see FIGS. 2C, 2D) that may be formed or made with embodiments of the methods 150, 200, 300 disclosed herein. FIG. 2C is an illustration of a partial cross-sectional exploded view of the bonded structure 50 that may be made with one of the embodiments of the methods 150, 200, 300 disclosed herein. FIG. 2D is an illustration of a partial cross-sectional view of the bonded structure 50 of FIG. 2C. The bonded structure 50 may comprise the first composite structure or substrate 32 having the first composite surface 34 to be bonded and may comprise a metal structure or substrate 52 having a metal surface 54 to be bonded. The metal structure or substrate 52 may preferably be made of a metal material, such as aluminum, titanium, steel, alloys thereof, or another suitable metal material. As discussed in detail below, the first composite surface 34 and/or the second metal surface 34 are prepared or treated with a surface preparation treatment or process prior to structural bonding. Alternatively, the bonded structure may comprise a first metal structure or substrate bonded to a second metal structure or substrate without a primer layer.

Figures 2E, 2F:
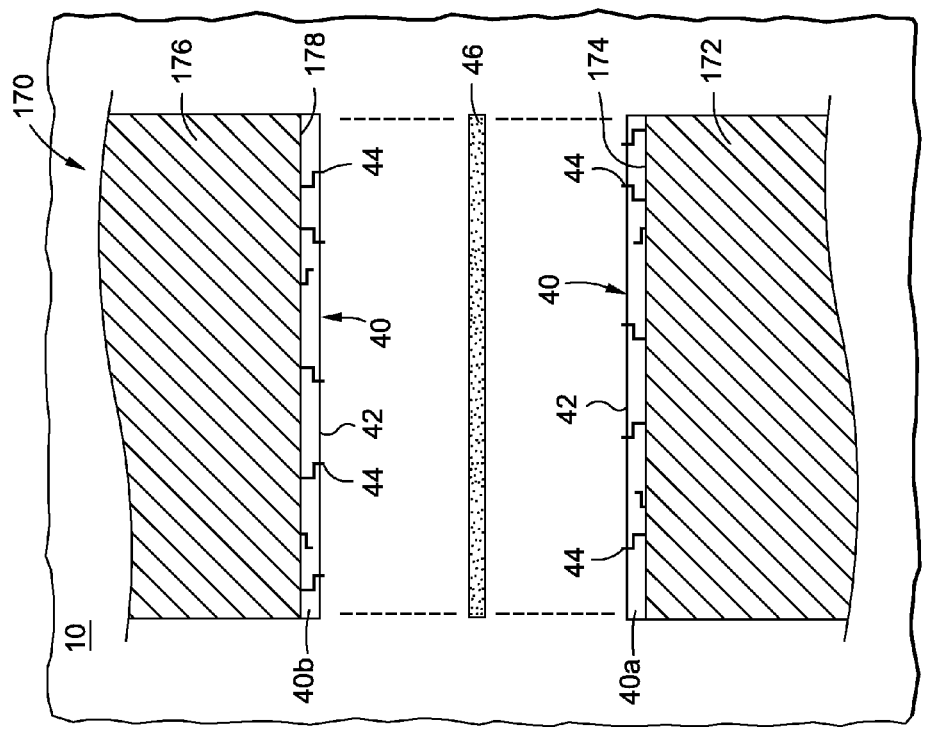
FIG. 2E is an illustration of a partial cross-sectional exploded view of a bonded aircraft structure that may be made with one of the embodiments of the methods disclosed herein.
FIG. 2F is an illustration of a partial cross-sectional view of the bonded aircraft structure of FIG. 2E.

In another one of the embodiments there is provided a bonded polymeric composite aircraft structure 170 (see FIGS. 2E, 2F) for an aircraft 10 (see FIGS. 1, 2E, 2F) that may be formed or made with embodiments of the methods 150, 200, 300 disclosed herein. FIG. 2E is an illustration of a partial cross-sectional exploded view of the bonded aircraft structure 170 that may be made with one of the embodiments of the methods 150, 200, 300 disclosed herein. FIG. 2F is an illustration of a partial cross-sectional view of the bonded aircraft structure 170 of FIG. 2E. The bonded polymeric composite aircraft structure 170 may comprise a first polymeric composite aircraft structure 172 and a second polymeric composite aircraft structure 176 in an aircraft 10. Preferably, the bonded aircraft structure has a first prepared surface 174 and a second prepared surface 178 that has been prepared or treated with a surface preparation treatment or process, discussed in detail below, prior to structural bonding. The first and second polymeric composite aircraft structures 172, 176 are made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, graphite (Gr)/bismaleimide (BMI).

In another one of the embodiments there is provided a repair bonded structure 60 that may be formed or made with embodiments of the methods 150, 200, 300 is disclosed. FIG. 3A is an illustration of a partial cross-sectional exploded view of an embodiment of the repair bonded structure 60 that may be made with embodiments of the methods 150, 200, 300 disclosed herein. FIG. 3B is an illustration of a partial cross-sectional view of the repair bonded structure 60 of FIG. 3A. As shown in FIGS. 3A and 3B, the repair bonded structure 60 is preferably a composite structure comprising a first composite structural portion 62 having a first composite surface 64 to be repair bonded and a second composite structural portion 66 having a second composite surface 68 to be repaired. The first and second composite structural portions 62, 66 may be made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, bismaleimide (BMI). As discussed in detail below, the first composite surface 64 and/or the second composite surface 68 are prepared or treated with a surface preparation treatment or process prior to repair bonding.

As further shown in FIGS. 2A-2F and 3A, 3B, the bonded structures 30, 50, 170 and the repair bonded structure 60 further comprise at least one functional group-adhesive promoter derivatized layer 40 that is deposited on the prepared composite or metal surface to be bonded. The functional group-adhesive promoter derivatized layer 40 has a surface 42 and functional groups 44 which are discussed in detail below. As shown in FIGS. 2A, 2C, 2E, 3A, the bonded structures 30, 50, 170 and the repair bonded structure 60 may comprise a first functional group-adhesive promoter derivitized layer 40a and a second functional group-adhesive promoter derivitized layer 40b. As shown in FIGS. 2A-2F and 3A, 3B, the bonded structures 30, 50, 170 and the repair bonded structure 60 each further comprise an adhesive layer 46, discussed in detail below, that is applied to the surface 42 of at least one of the functional group-adhesive promoter derivatized layers 40, so as to form a structural bond 48 (see FIG. 2B), structural bond 56 (see FIG. 2D), an aircraft structural bond 180 (see FIG. 2F), or a repair bond 70 (see FIG. 3B).

Figure 18:
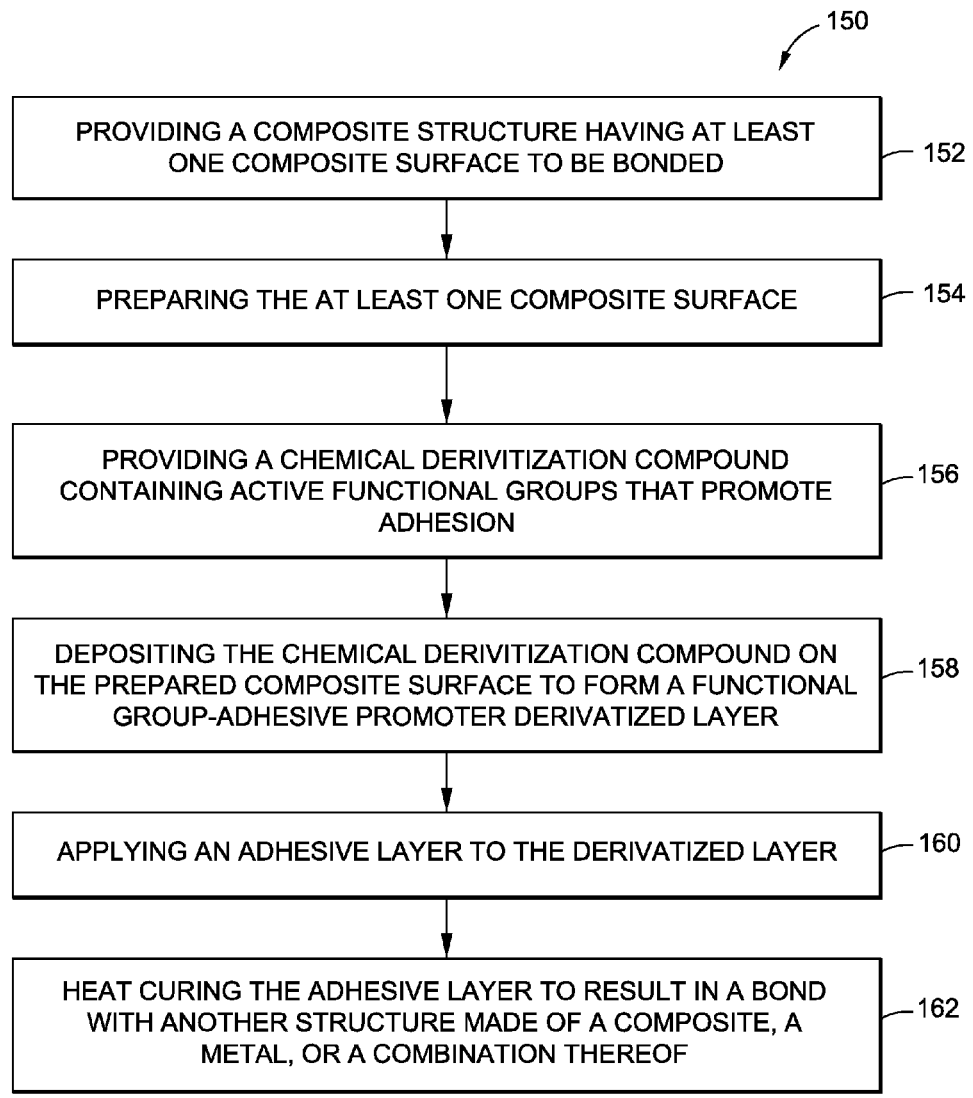
FIG. 18 is an illustration of a flow diagram of one of the embodiments of a method of the disclosure.

In another one of the embodiments of the disclosure, there is provided a method 150, as shown in FIG. 18, of promoting adhesion on a composite surface prior to bonding, such as structural bonding or repair bonding. FIG. 18 is an illustration of a flow diagram of one of the embodiments of the method 150 of the disclosure. The method 150 comprises step 152 of providing a composite structure or substrate 32 (see FIGS. 2A-2B) having at least one composite surface 34 (see FIGS. 2A-2B) to be bonded or repaired. The composite structure or substrate 32 is made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, graphite (Gr)/bismaleimide (BMI). Bismaleimides are particularly preferred for use in high performance structural composites requiring higher temperature use and increased toughness and durability. The double bond of the maleimide is very reactive and can undergo chain extension reactions. Epoxy blends of bismaleimide have exhibited use temperatures of 205° C. (degrees Celsius) to 245° C. and increased toughness and durability.

FIG. 4A is an illustration of the chemical structure of a bismaleimide prepolymer 72 and shows the functional groups of allyl 74 and hydroxyl 76 and "R" group 78. FIG. 4B is an illustration of the chemical structure where the "R" group 78 is propenyl 80 for the bismaleimide prepolymer 72 of FIG. 4A. FIG. 4C is an illustration of the chemical structure where the "R" group 78 is maleimide 82 for the bismaleimide prepolymer 72 of FIG. 4A. FIG. 4D is an illustration of a table 84 listing the functional groups allyl 74, hydroxyl 76, propenyl 80, and maleimide 82 of the bismaleimide prepolymer 72 of FIG. 3A and the reactions of the functional groups. As shown in the table 84 of FIG. 4D, the reaction of allyl 74 is an addition reaction to maleimide, the reaction of hydroxyl 76 is a condensation reaction to ether, and the reactions of propenyl 80 and maleimide 82 are crosslinking via homopolymerization. For purpose of this disclosure, "functional groups" mean specific groups of atoms within molecules that are responsible for the characteristic chemical reactions of those molecules. The atoms of functional groups are linked to each other and to the rest of the molecule by covalent bonds. Organic reactions are facilitated and controlled by the functional groups of the reactants.

The method 150 further comprises step 154 of preparing or treating with one or more surface preparation treatments the at least one composite surface 34 (see FIGS. 2A, 2C) prior to structural bonding or composite surface 64 (see FIG. 3A) prior to repair bonding. In addition, the preparing or treating step 154 with one or more surface preparation treatments may comprise preparing or treating composite surface 38 (see FIG. 2A) or metal surface 54 (see FIG. 2C) prior to structural bonding or composite surface 68 (see FIG. 3A) prior to repair bonding The composite, metal or combination composite/metal surfaces may be prepared with one or more surface preparation treatments comprising solvent wiping, abrading, grit blasting, sanding, sandblasting, chemical cleaning, chemical etching, or another suitable surface preparation treatment.

In particular, structural bonding processes rely on sanding to remove contaminants, and increase the surface energy on a limited basis on the composite surface. Preparing or treating the composite surface, such as sanding the composite surface, unexpectedly exposed unique and additional secondary functional groups on the composite surface that have positive durable adhesive promoter effects by increasing adhesive wettability tension and long-term bonding joint durability between composite structures, for example, an aircraft skin and an aircraft stringer. Increased surface energy due to these unique and additional secondary functional groups improves the wettability tension of the adhesive that results in mechanical lock between composite structures. For purposes of this disclosure, "wettability tension" means the ability of a solid surface to reduce the surface tension of a liquid in contact with it such that it spreads over the surface and wets it. Fluids with low surface tension have high wettability, and fluids with high surface tension have low wettability.

Figure 6A:
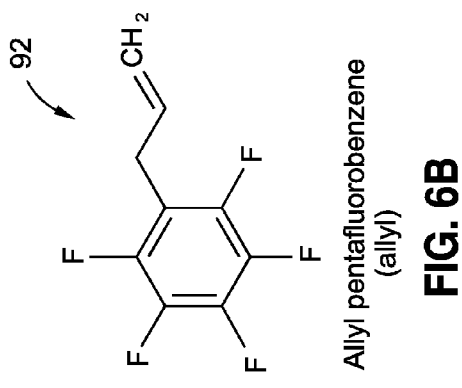
FIG. 6A is an illustration of the chemical structure of a chemical derivatization compound pentafluorophenol that may be used in embodiments of the methods disclosed herein.
Figure 6B:
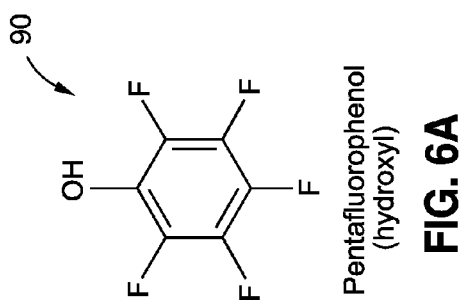
FIG. 6B is an illustration of the chemical structure of a chemical derivatization compound allyl pentafluorobenzene that may be used in embodiments of the methods disclosed herein.
Figure 6C:
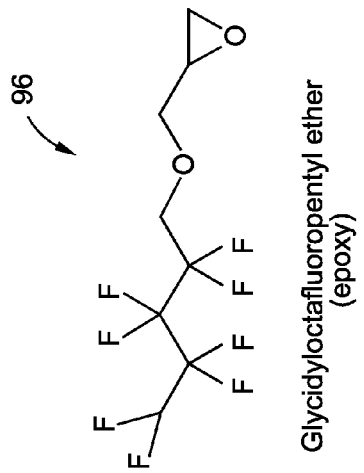
FIG. 6C is an illustration of the chemical structure of a chemical derivatization compound tridecafluorononyl maleimide that may be used in embodiments of the methods disclosed herein.
Figure 6D:
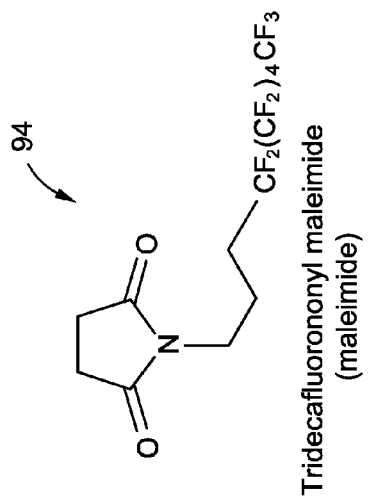
FIG. 6D is an illustration of the chemical structure of a chemical derivatization compound glycidyloctafluoropentyl ether that may be used in embodiments of the methods disclosed herein.

The method 150 further comprises step 156 of providing a chemical derivatization compound, such as for example, a fluorinated compound, tetrafluoroaceticanhydride (TFAA), pentafluorophenol, allyl pentafluorobenzene, tridecafluorononyl maleimide, glycidyloctafluoropentyl ether, or another fluorinated compound or another suitable chemical derivatization compound. FIG. 6A is an illustration of the chemical structure of chemical derivatization compound pentafluorophenol 90 that may be used in method 150, as well as methods 200, 300 disclosed herein. FIG. 6B is an illustration of the chemical structure of chemical derivatization compound allyl pentafluorobenzene 92 that may be used in method 150, as well as methods 200, 300 disclosed herein. FIG. 6C is an illustration of the chemical structure of chemical derivatization compound tridecafluorononyl maleimide 94 that may be used in method 150, as well as methods 200, 300 disclosed herein. FIG. 6D is an illustration of the chemical structure of chemical derivatization compound glycidyloctafluoropentyl ether 96 that may be used in method 150, as well as methods 200, 300 disclosed herein. The chemical derivatization compounds contain active functional groups that promote adhesion and detect adhesion mechanisms. For example, as shown in FIGS. 6A-6D, pentafluorophenol 90 contains hydroxyl, allyl pentafluorobenzene 92 contains allyl, tridecafluorononyl maleimide 94 contains maleimide, and glycidyloctafluoropentyl ether 96 contains epoxy.

The method 150 further comprises step 158 of depositing or applying the chemical derivatization compound on the composite surface 34 or 64, for example, that has been prepared in order to form a functional group-adhesive promoter derivatized layer 40 (see FIGS. 2A-2D and 3A-3B) via a derivatization reaction. For purposes of this disclosure, the term "derivatization" means a technique or reaction used in chemistry which transforms a chemical compound into a product (a reaction's derivate) of similar chemical structure called a derivative. A specific functional group of the compound participates in the derivatization reaction and transforms the educt to a derivate of deviating reactivity, solubility, boiling point, melting point, aggregate state, or chemical composition. The derivatization reactions used in the methods 150, 200, 300 disclosed herein transform the composite surface 34 or 64, for example, by covalently bonding chemicals or molecules to the composite surface 34 or 64.

Figure 21:
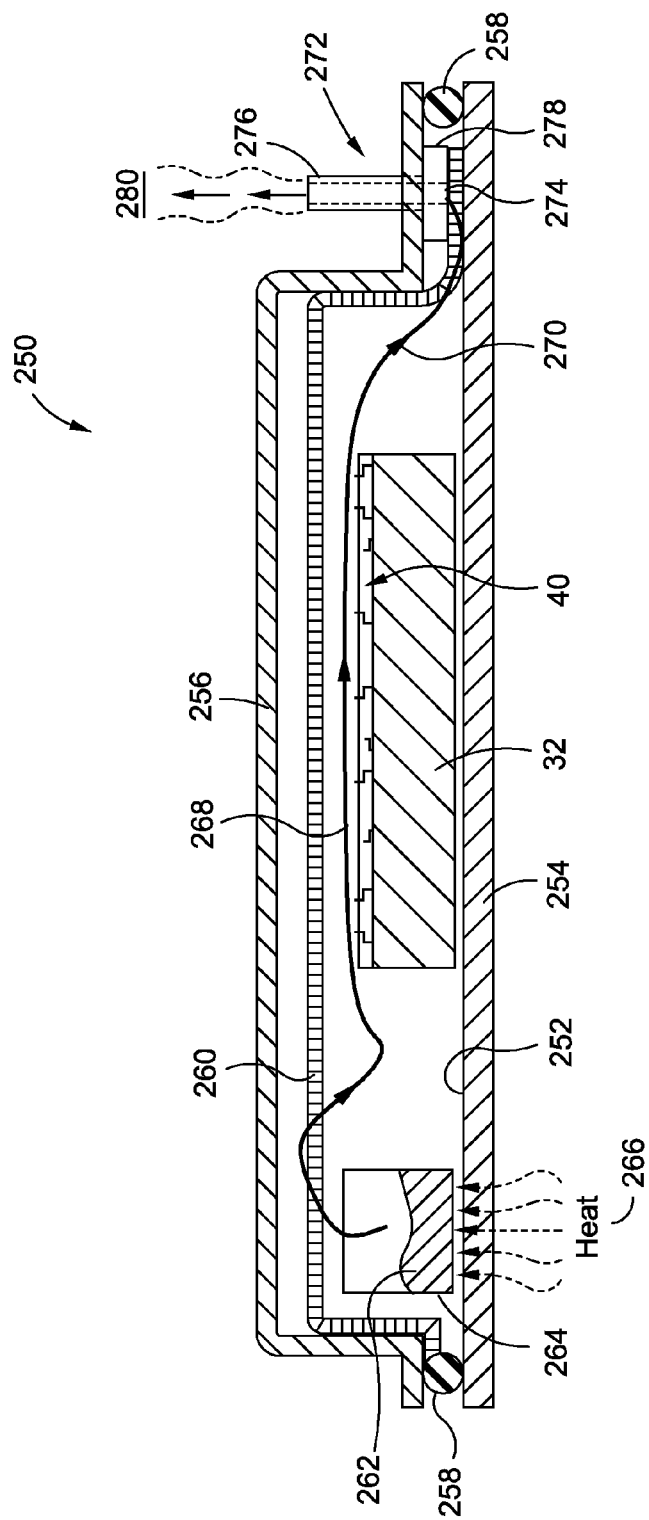
FIG. 21 is an illustration of a partial cross-sectional view of an exemplary chemical vapor deposition in a vacuum bag set-up that may be used with embodiments of the methods of the disclosure.

The chemical derivatization compound 90, 92, 94, 96, may be deposited on the prepared composite surface 34 or 64, for example, via chemical vapor deposition, such as chemical vapor deposition in a vacuum bag set-up, vacuum deposition, or another suitable deposition or application process. FIG. 21 is an illustration of a partial cross-sectional view of an exemplary chemical vapor deposition in a vacuum bag set-up 250 that may be used with embodiments of the methods 150, 200, 300 of the disclosure. As shown in FIG. 21, the chemical vapor deposition in a vacuum bag set-up 250 comprises a vacuum bag 256 coupled with seals 258 to a top surface 252 of a flat table 254 or other flat surface. A separator element 260, such as for example, a mesh wire screen, may be placed between the vacuum bag 256 and the first composite structure or substrate 32. A liquid or solid phase chemical derivatization compound 264 is poured into a container 262, such as a glass vial, and is heated with a heat source 266. With heat, the liquid or solid phase chemical derivatization compound 264 vaporizes to become a vapor phase or vaporized chemical derivatization compound 268. The vapor phase chemical derivatization compound 268 travels along a path 270 and over the substrate 32 to react and deposit to form the functional group-adhesive promoter derivatized layer 40 on the substrate 32. Any vapor phase chemical derivatization compound 268 that is unreacted travels along the path 270 and through a vacuum port 272 and an opening 274 in the vacuum bag 256. The vacuum port 272 comprises a first portion 276 attached above the vacuum bag 256 and a second portion 278 attached below the vacuum bag 256. Any unreacted vapor phase chemical derivatization compound 280 escapes out of the vacuum port 272 and out of the vacuum bag set-up 250. Preferably, the prepared composite surface or substrate 34 or 64, for example, may be exposed to the vapor phase chemical derivatization compound 268 containing selected functional groups. The selection of the functional groups is preferably based on a resin formulation of the composite structure, for example. In particular, for composite structures made of bismaleimide, it has been unexpectedly found that the chemical derivatization compounds 90, 92, 94, 96 form carbon-carbon double bond functional groups on a derivatized surface of the bismaleimide.

Figure 5:
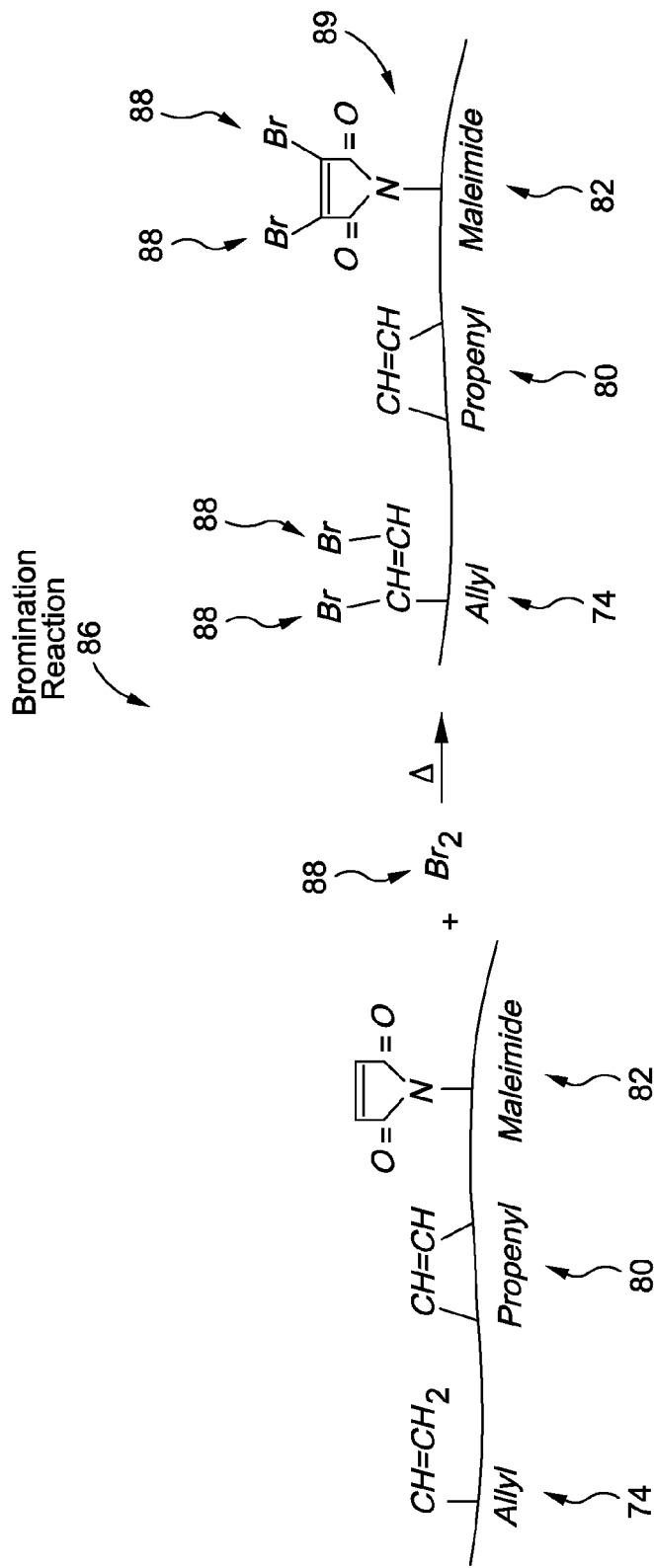
FIG. 5 is an illustration of a bromination derivatization reaction mechanism of the functional groups of the bismaleimide prepolymer before and after the bromination reaction.

Derivatization reaction mechanisms capable of creating reactive useful functional groups on a composite structure include such derivatization reaction mechanisms as bromination, silination, and thionation. FIG. 5 is an illustration of a bromination derivatization reaction mechanism 86 in which the functional groups allyl 74, propenyl 80, and maleimide 82 of the bismaleimide prepolymer 72 (see FIG. 4A) react with bromine 88 to obtain a bromination reaction product 89. The bromination derivatization reaction attacks double bonds exposed on the composite surface. Double bonds are electron rich environments that promote secondary bonding forces between the adhesive and the composite structural surface.

FIG. 7 is an illustration of a silination derivatization reaction mechanism 98 in which a silane solution or gel 100 reacts with carbon-carbon double bond 102 to obtain a silination reaction product 104. The silination derivatization reaction is capable of reaction with units of unsaturation on the composite surface and introduces entire organic functional groups onto the composite surface.

FIG. 8 is an illustration of a thionation derivatization reaction mechanism 106 in which a thiol solution or gel 108 reacts with carbon-carbon double bond 102 to obtain a thionation reaction product 110. The thionation derivatization reaction reacts with units of unsaturation introducing organic containing sulfur functional groups onto the composite surface.

X-ray photoelectron spectroscopy techniques can be used to identify specific functional groups that influence a composite to composite bond or joint when one or both composites are made from a bismaleimide matrix material. FIG. 9 is an illustration of a table 112 listing the potential bismaleimide adhesion reactions, including the functional group types, the possible reactions with bismaleimide/epoxy adhesive, and the temperature range. For the functional group allyl 74, the possible reaction with bismaleimide/epoxy adhesive is "ene" addition to maleimide at a temperature in the range of 200° C. (degrees Celsius) to 300° C. For the functional group hydroxyl 76, the possible reaction with bismaleimide/epoxy adhesive is etherification at a temperature of greater than 240° C. For the functional group hydroxyl-epoxide, the possible reaction with bismaleimide/epoxy adhesive is epoxy addition at a temperature of greater than 100° C. For the functional group maleimide 82, the possible reaction with bismaleimide/epoxy adhesive is maleimide addition to maleimide at a temperature of greater than 100° C.

The method 150, as well as methods 200, 300, discussed below, introduce unique functional groups as a structural adhesive promoter on composite surfaces made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, bismaleimide (BMI). This is achieved by introducing functional groups though derivatization reaction mechanisms on the composite surface to be bonded such as for structural bonding or repair bonding. These functional groups accelerate the secondary interaction between the adhesive and the composite surface thereby increasing the repair design long life and durability of the composite bonded joint under hostile operating environments. The method 150, as well as methods 200, 300, discussed below, transform the composite surface of the composite structure from a limited active surface to a highly activated adhesive promoter of durable-bonding surface characteristics. A variety of forces are presumed to be responsible for a successful and effective composite bonded joint or repair bond. Primary bonding forces include the covalent bonds created between the composite surface and the adhesive material, as well as Van der Waals forces that are also created at the composite-adhesive interface. For purposes of this disclosure, "Van der Waals forces" mean the sum of the attractive or repulsive forces between molecules or between parts of the same molecule other than those due to covalent bonds or to electrostatic interaction of ions with one another or with neutral molecules. For purposes of this disclosure, "covalent bonds" means a chemical bond that is characterized by the sharing of pairs of electrons between atoms, and other covalent bonds.

The method 150, as well as methods 200, 300, discussed below, use chemical derivatization to create a functional group-adhesive promoter type layer on the structural composite surface as a bonding agent. Moreover, on bismaleimide composite surfaces, the formation of carbon-carbon double bond (C═C) (unsaturation) functional groups on such surfaces through derivatization reactions was unexpectedly found, which results in a structurally sound and durable composite bond that can be used in various structures, for example, aircraft structures. A mono layer of derivatizing chemicals at otherwise inactive sites on the composite surface creates a thin film adhesive promoter that promotes adhesion. For purposes of this disclosure, "adhesive promoter" means a material that helps an adhesive bond to a surface and that is applied to the surface before the adhesive is applied.

The method 150 further comprises step 160 of applying an adhesive layer 46 (see FIGS. 2A-2F and 3A, 3B) to the surface 42 of the functional group-adhesive promoter derivatized layer 40 of at least, for example, the composite structure 32 (see FIGS. 2A, 2C), the first polymeric composite aircraft structure 172 (see FIG. 2E), or the first composite structural portion 62 (see FIG. 3A). In addition, the adhesive layer 46 may also be applied to the surface 42 of the functional group-adhesive promoter derivatized layer 40 of the composite structure 36 (see FIG. 2A) or the second polymeric composite aircraft structure 176 (see FIG. 2E) or the metal structure 52 (see FIG. 2C) or the second composite structural portion 66 (see FIG. 3A). The adhesive layer 46 may preferably comprise film adhesives, such as epoxies, bismaleimides, or another suitable adhesive.

The method 150 further comprises step 162 of heat curing the adhesive layer 46 to result in a bond with another structure made of a composite, a metal, or a combination thereof. The bond may comprise, for example, a structural bond 48 (see FIG. 2B), 56 (see FIG. 2D), or 180 (see FIG. 2F), or a repair bond 70 (see FIG. 3B). As shown in the drawings, heat curing the adhesive layer 46 can result in the structural bond 48 (see FIG. 2B) with another structure, such as between first composite structure 32 and second composite structure, or can result in the structural bond 56 (see FIG. 2D) with another structure, such as between first composite structure 32 and metal structure 52, or can result in the aircraft structural bond 180 (see FIG. 2F) with another structure, such as between first polymeric composite aircraft 172 and second polymeric composite aircraft structure 174, or can result in the repair bond 70 (see FIG. 3B), such as between first composite structural portion 62 and second composite structural portion 66. The other structure may comprise, for example, a composite structure 36 (see FIGS. 2A-2B) that is comprised of the same composite material as the composite structure 32 or a different composite material than the composite structure 32. In another embodiment, the other structure may comprise a metal structure 52 (see FIGS. 2C-2D) that may preferably be made of a metal material such as aluminum, titanium, steel, alloys thereof, or another suitable metal material. In another embodiment, the other structure may comprise a structure made of a combination of a composite material and a metal material. The composite structure 32 and the other structure made of the composite, the metal, or the combination thereof, are preferably aircraft structures for manufacturing an aircraft 10 (see FIG. 1), for example, polymeric aircraft structures 172, 176 (see FIG. 2E) may be used to form the wings 18 or fuselage 12 or aircraft 10.

Figure 19:
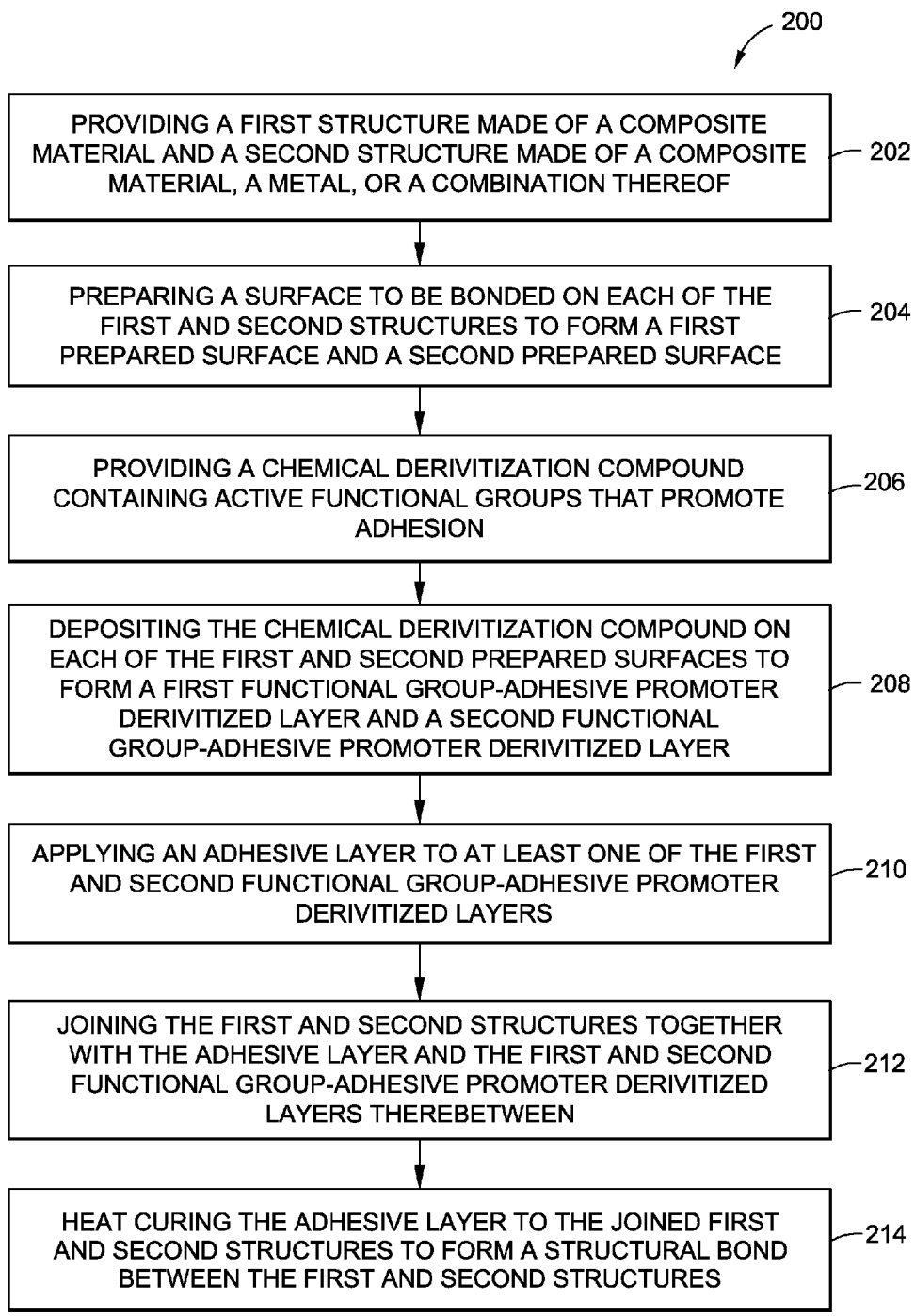
FIG. 19 is an illustration of a flow diagram of another one of the embodiments of a method of the disclosure.

FIG. 19 is an illustration of a flow diagram of another one of the embodiments of a method 200 for structural bonding of structures. The method 200 comprises step 202 of providing a first structure 32 (see FIGS. 2A-2D) made of a composite material and a second structure 36 (see FIG. 2A) made of a composite material, a second structure 52 made of a metal material, or a second structure made of a combination of a composite material and a metal material. The first composite structure 32 and the second structure, if made of a composite material or a combination of composite material, are made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, bismaleimide (BMI). If the second structure is made of metal material or a combination of metal material and composite material, preferably the metal material comprise such as aluminum, titanium, steel, alloys thereof, or another suitable metal material. Preferably, the first and second structures are aircraft structures.

The method 200 further comprises step 204 of preparing a surface to be bonded, such as composite surfaces 34, 38 (see FIG. 2A) or a metal surface 54 (see FIG. 2C) on each of the first and second structures 32, 36 (see FIG. 2A) or 32, 52 (see FIG. 2C) to obtain a first surface 34 that has been prepared and a second surface 38 or 54 that has been prepared. As discussed above, the surface to be bonded is preferably prepared with one or more surface preparation treatments comprising solvent wiping, abrading, grit blasting, sanding, sandblasting, chemical etching, or another suitable surface preparation treatment.

The method 200 further comprises step 206 of providing a chemical derivatization compound (90, 92, 94, 96 (see FIGS. 6A-6D)) containing active functional groups that promote adhesion. As discussed above, the chemical derivatization compound preferably comprises fluorinated compounds, tetrafluoroaceticanhydride (TFAA), pentafluorophenol, allyl pentafluorobenzene, tridecafluorononyl maleimide, glycidyloctafluoropentyl ether, or another fluorinated compound, or another suitable chemical derivatization compound. The method 200 further comprises step 208 of depositing the chemical derivatization compound (90, 92, 94, 96 (see FIGS. 6A-6D)) on each of the first and second surfaces 34, 38 (see FIG. 2A) or 34, 54 (see FIG. 2C) that have been prepared in order to form a first functional group-adhesive promoter derivitized layer 40a (see FIGS. 2A, 2C) and a second functional group-adhesive promoter derivitized layer 40b (see FIGS. 2A, 2C). The chemical derivatization compound may be deposited on the prepared composite surface via chemical vapor deposition, such as chemical vapor deposition in a vacuum bag set-up; vacuum deposition; or another suitable deposition or application process. The chemical vapor deposition in a vacuum bag set-up 250 is shown in FIG. 21 and is discussed in detail above. The method 200 further comprises step 210 of applying an adhesive layer 46 to at least one of the first and second functional group-adhesive promoter derivitized layers 40a, 40b. As discussed above, the adhesive layer 46 may preferably comprise film adhesives, such as epoxies, bismaleimides, or another suitable adhesive.

The method 200 further comprises step 212 of joining the first and second structures 32, 36 (see FIG. 2A) or 32, 52 (see FIG. 2C) together with the adhesive layer 46 and the first and second functional group-adhesive promoter derivitized layers 40a, 40b therebetween. The method 200 further comprises step 214 of heat curing the adhesive layer 46 to the joined first and second structures 32, 36 (see FIG. 2A) or 32, 52 (see FIG. 2C) to form a structural bond 48 (see FIG. 2B) or 56 (FIG. 2D) between the first and second structures 32, 36 (see FIG. 2A) or 32, 52 (see FIG. 2C), respectively. The first structure 32 made of a composite material is preferably an aircraft structure. The other second structure 36 (see FIG. 2A) made of the composite, the other second structure 52 made of the metal, or the other second structure made of a combination of composite and metal, are also preferably aircraft structures.

Figure 20:
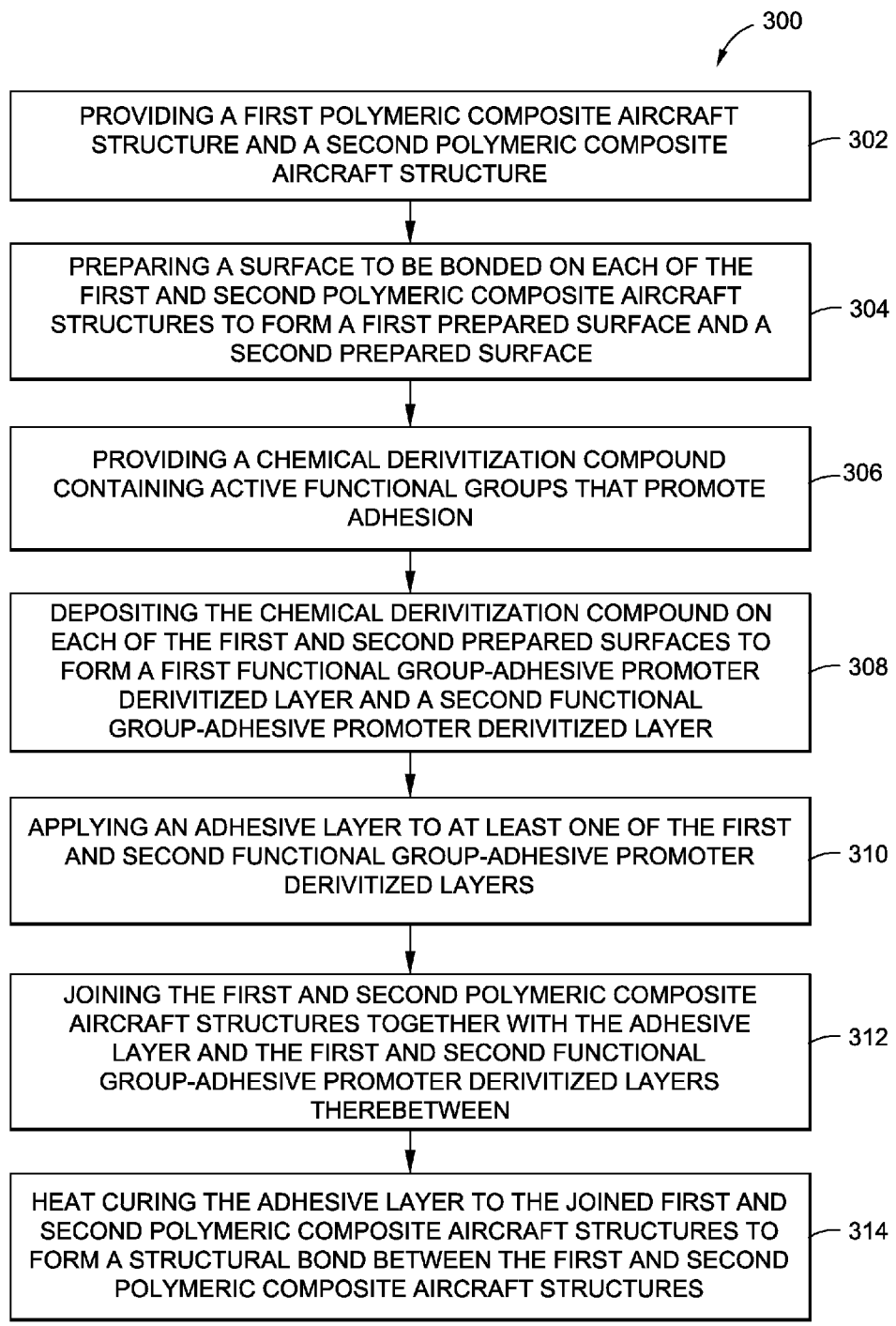
FIG. 20 is an illustration of a flow diagram of another one of the embodiments of a method of the disclosure.

FIG. 20 is an illustration of a flow diagram of another one of the embodiments of a method 300 for structural bonding of polymeric composite structures of an aircraft 10 (see FIGS. 1, 2E, 2F). The method 300 comprises step 302 of providing a first polymeric composite aircraft structure 172 and a second polymeric composite aircraft structure 176 (see FIG. 2E). The first polymeric composite aircraft structure 172 and the second polymeric composite aircraft structure 176 are made of a polymeric composite material comprising preferably, one or more of bismaleimides (BMI), epoxies, polyimides, or another suitable polymeric composite material; more preferably, graphite (Gr)/bismaleimide, graphite (Gr)/epoxy, or graphite (Gr)/polyimide; and most preferably, bismaleimide (BMI).

The method 300 further comprises step 304 of preparing a surface to be bonded on each of the first and second polymeric composite aircraft structures 172, 176 in order to form a first prepared surface 174 and a second prepared surface 178 (see FIG. 2E), respectively. The first prepared surface 174 and the second prepared surface 178 are preferably prepared with one or more surface preparation treatments comprising solvent wiping, abrading, grit blasting, sanding, sandblasting, chemical etching, or another suitable surface preparation treatment.

The method 300 further comprises step 306 of providing a chemical derivatization compound (90, 92, 94, 96 (see FIGS. 6A-6D)) containing active functional groups that promote adhesion. As discussed above, the chemical derivatization compound preferably comprises fluorinated compounds, tetrafluoroaceticanhydride (TFAA), pentafluorophenol, allyl pentafluorobenzene, tridecafluorononyl maleimide, glycidyloctafluoropentyl ether, or another fluorinated compound, or another suitable chemical derivatization compound. The method 300 further comprises step 308 of depositing the chemical derivatization compound (90, 92, 94, 96 (see FIGS. 6A-6D)) on each of the first and second prepared surfaces 174, 178, to form a first functional group-adhesive promoter derivitized layer 40*a* and a second functional group-adhesive promoter derivitized layer 40*b* (see FIG. 2E). The chemical derivatization compound may be deposited on the first and second prepared surfaces 174, 178 via chemical vapor deposition, such as chemical vapor deposition in a vacuum bag set-up; vacuum deposition; or another suitable deposition or application process. The chemical vapor deposition in a vacuum bag set-up 250 is shown in FIG. 21 and is discussed in detail above. For first and second polymeric composite aircraft structures 172, 176 made of bismaleimide, chemical derivatization compounds can form carbon-carbon double bond functional groups on the derivatized layer or surface of the bismaleimide.

The method 300 further comprises step 310 of applying an adhesive layer 46 to at least one of the first and second functional group-adhesive promoter derivitized layers 40*a*, 40*b*. As discussed above, the adhesive layer 46 may preferably comprise film adhesives, such as epoxies, bismaleimides, or another suitable adhesive. The method 300 further comprises step 312 of joining the first and second polymeric composite aircraft structures 172, 176 together with the adhesive layer 46 and the first and second functional group-adhesive promoter derivitized layers 40*a*, 40*b* therebetween. The method 300 further comprises step 314 of heat curing the adhesive layer 46 to the joined first and second polymeric composite aircraft structures 172, 176 to form an aircraft structural bond 180 (see FIG. 2F) between the first and second polymeric composite aircraft structures 172, 176.

Figure 30:
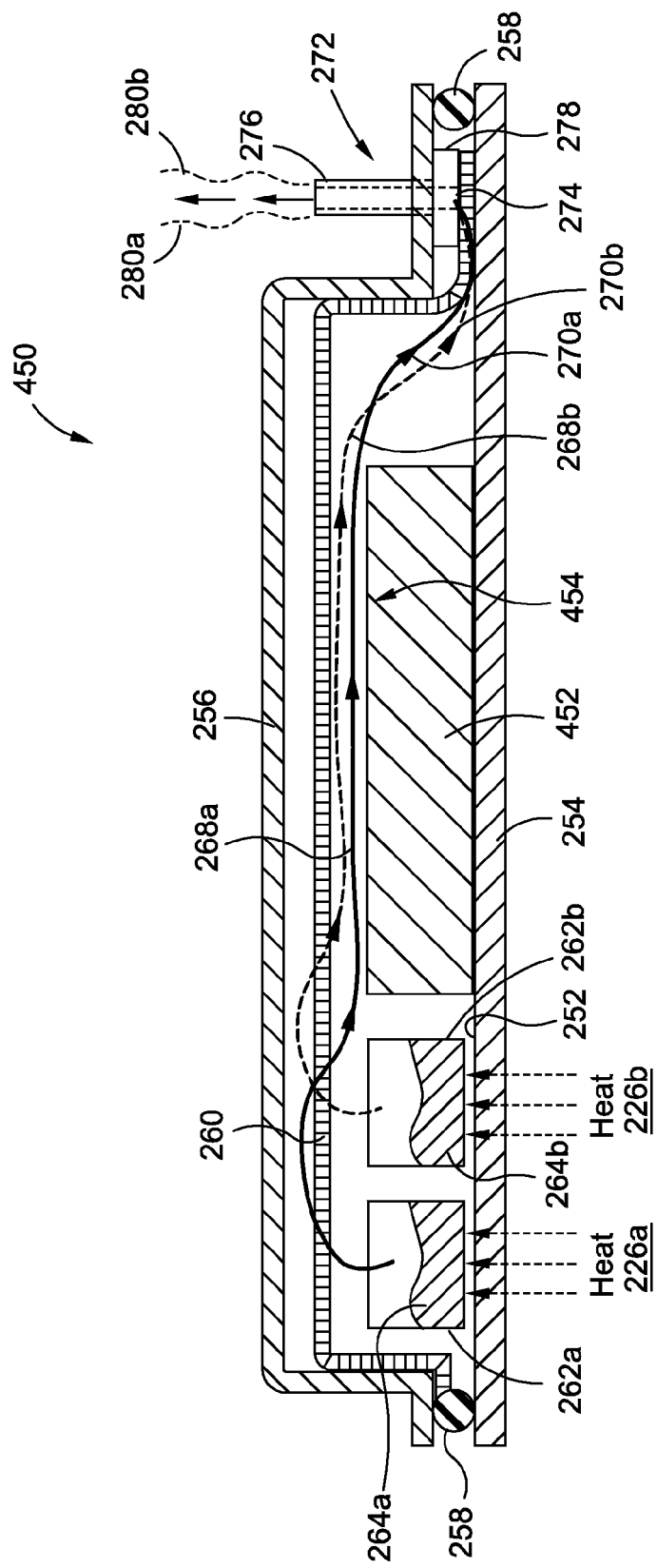
FIG. 30 is an illustration of a partial cross-sectional view of another exemplary chemical vapor deposition in a vacuum bag set-up that may be used with embodiments of the methods of the disclosure; and, FIG. 31 is an illustration of a flow diagram of another one of the embodiments of a method of the disclosure.
Figure 31:
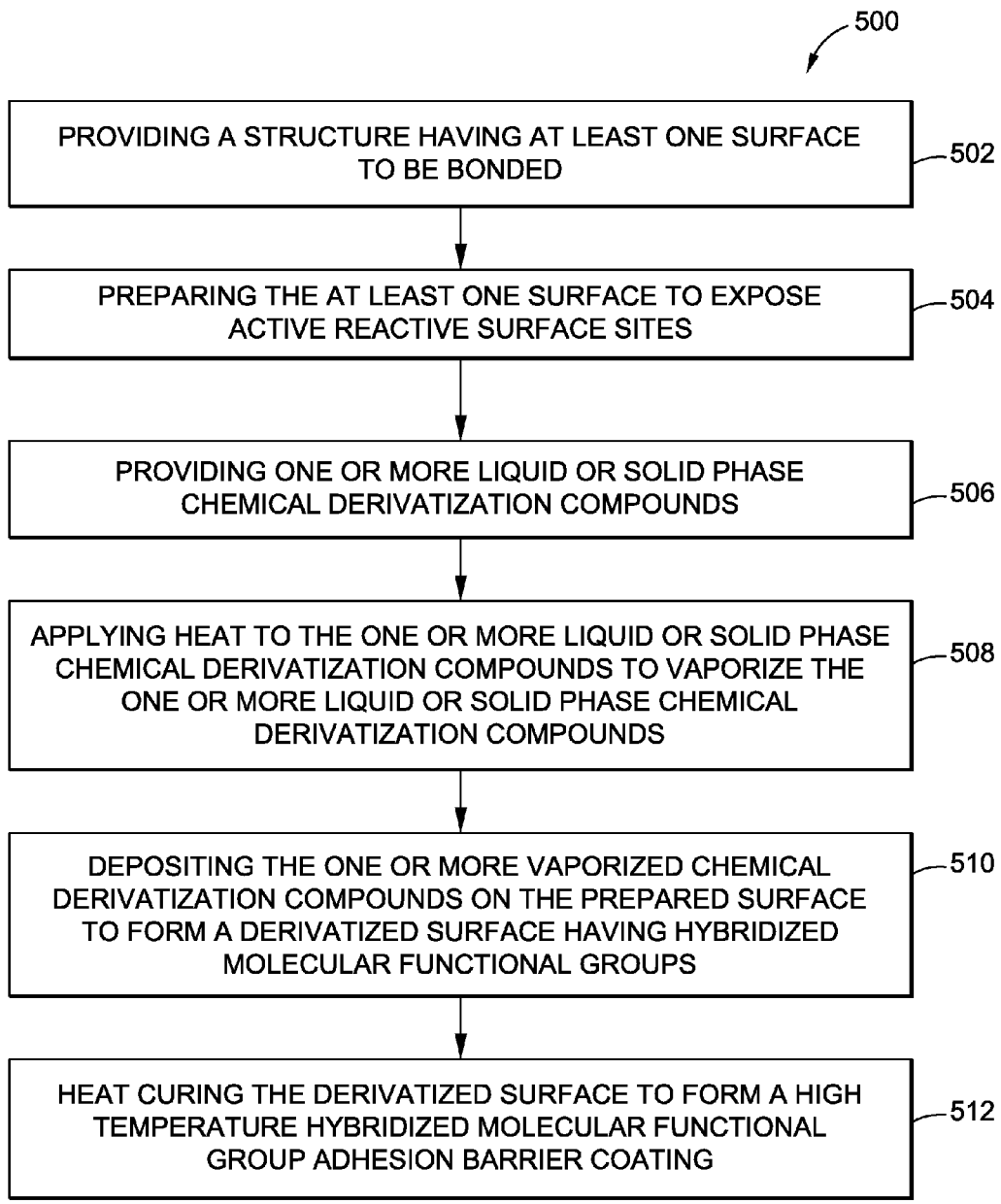

In another embodiment of the disclosure, there is provided a method 500 of applying a high temperature hybridized molecular functional group adhesion barrier coating to a surface 454 (see FIG. 30) of a structure 452 or substrate (see FIG. 30). FIG. 31 is an illustration of a flow diagram of another one of the embodiments of the method 500 of the disclosure. As shown in FIG. 31, the method 500 comprises step 502 of providing a structure 452 having at least one surface 454 to be bonded. The structure 452 or substrate may comprise a material such as a composite material, a metal material, a ceramic material, or another suitable material. The composite material preferably comprises bismaleimides (BMI), epoxies, polyimides, graphite/bismaleimide, graphite/epoxy, graphite/polyimide, a combination thereof, or another suitable composite material. The metal material preferably comprises super alloys such as nickel and copper based alloys, titanium, high temperature refractory alloys, or another suitable metal material. The ceramic material preferably comprises refractory based high temperature ceramic structural materials or another suitable ceramic material. The structure is preferably an aircraft structure, and more preferably, a nacelle, a fuel tank, an engine or another aircraft structure that may be exposed to high temperatures.

The method 500 further comprises step 504 of preparing the at least one surface 454 (see FIG. 30) to expose active reactive surface sites. The surface 454 may be prepared with one or more surface preparation treatments such as hand sanding, machine sanding, sandblasting, solvent wiping, abrading, grit blasting, chemical cleaning, chemical etching, or another suitable surface preparation treatment. Preferably, the surface preparation treatment is hand sanding.

The surface 454 that has been prepared may then be preferably placed into a treatment vessel or derivatization chamber, such as a vacuum bag 256 in chemical vapor deposition vacuum bag set-up 450 (see FIG. 30). FIG. 30 is an illustration of a partial cross-sectional view of an exemplary chemical vapor deposition in a vacuum bag set-up 450 that may be used with embodiments of the methods, such as method 500, of the disclosure. As shown in FIG. 30, the chemical vapor deposition in a vacuum bag set-up 450 comprises a vacuum bag 256 coupled with seals 258 to a top surface 252 of a flat table 254 or other flat surface. As further shown in FIG. 30, a separator element 260, such as for example, a mesh wire screen, may be placed between the vacuum bag 256 and a structure 452 or substrate having a surface 454.

The method 500 further comprises step 506 of providing one or more liquid or solid phase chemical derivatization compounds. The one or more liquid or solid phase chemical derivatization compounds may consist of pentafluorophenol 90 (see FIG. 6A), allyl pentafluorobenzene (see FIG. 6B), tridecafluorononyl maleimide (see FIG. 6C), glycidyl octafluoropentyl ether (see FIG. 6D), and fluorinated compounds.

The method 500 further comprises step 508 of applying heat to the one or more liquid or solid phase chemical derivatization compounds to vaporize the one or more liquid or solid chemical derivatization compounds. The heat applied to the one or more liquid or solid phase chemical derivatization compounds is preferably in a temperature range of from about 350 degrees Fahrenheit to about 500 degrees Fahrenheit. As shown in FIG. 30, a first liquid or solid phase chemical derivatization compound 264*a* is placed into a first container 262*a*, such as a glass vial, and is heated with a first heat source 226*a*, and a second liquid or solid phase chemical derivatization compound 264*b* is placed into a second container 262*b*, such as a glass vial, and is heated with a second heat source 226*b*.

Figure 22:
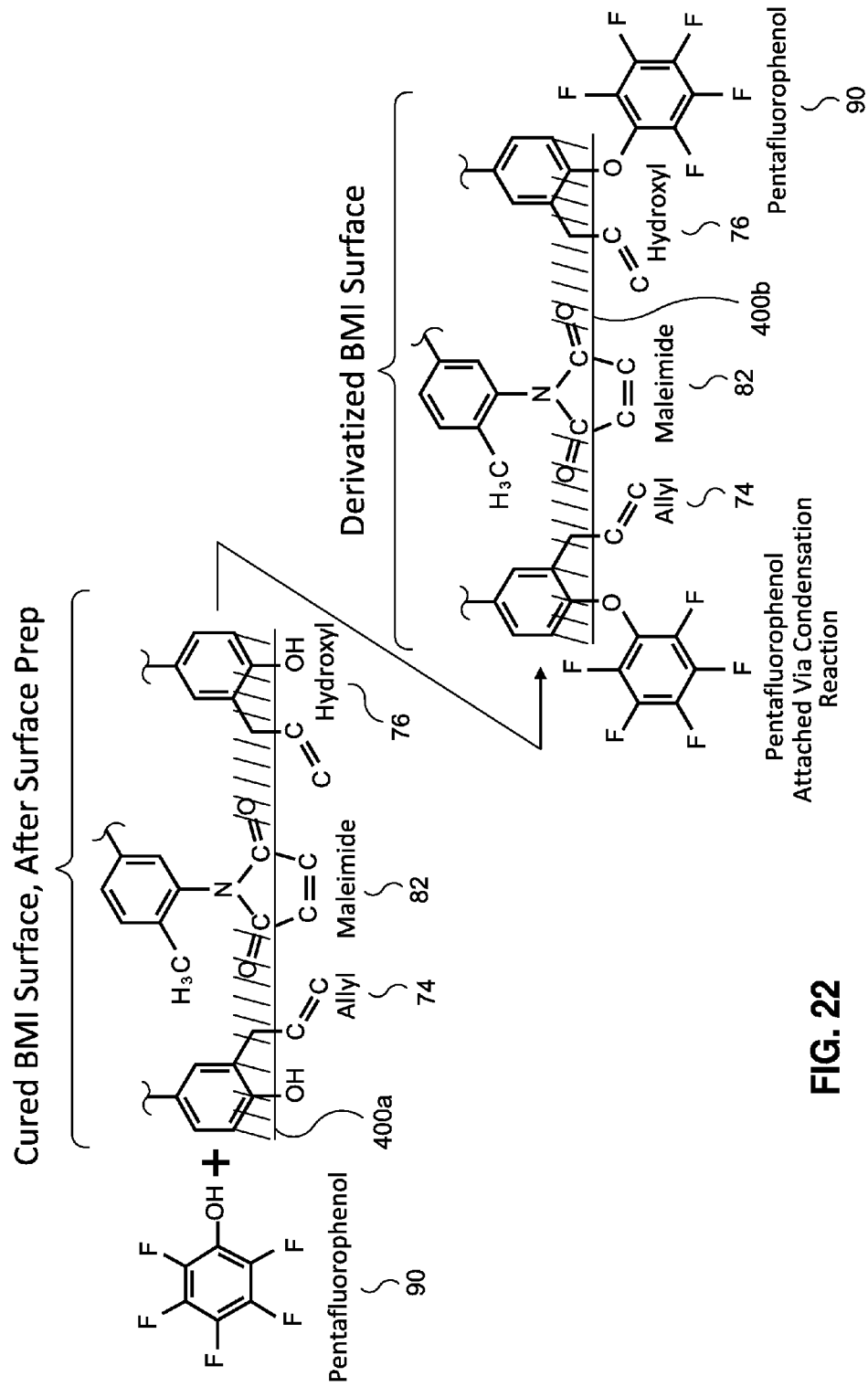
FIG. 22 is an illustration of a BMI derivatization reaction mechanism that may be combined with an epoxy derivatization reaction mechanism of FIG. 23 and used in embodiments of the methods disclosed herein.
Figure 23:
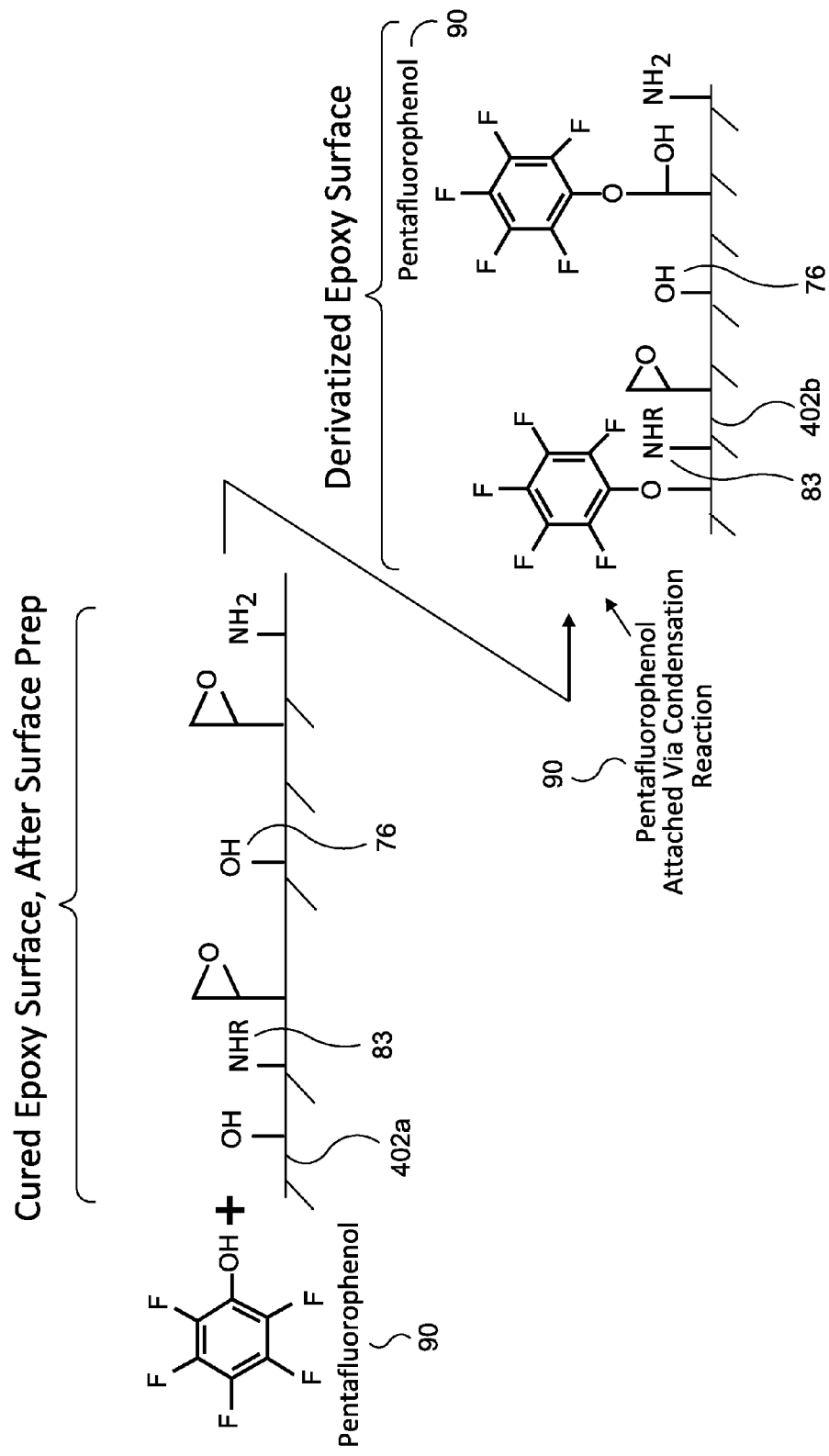
FIG. 23 is an illustration of an epoxy derivatization reaction mechanism that may be combined with a BMI derivatization reaction mechanism of FIG. 22 and that may be used in embodiments of the methods disclosed herein.

The method 500 further comprises step 510 of depositing the one or more vaporized chemical derivatization compounds on the surface 454 that has been prepared to form a derivatized surface 400*b* (see FIG. 22) or 402*b* (see FIG. 23) having hybridized molecular functional groups, such as hydroxyl 76 (see FIG. 4A), maleimide 82 (see FIG. 4C), allyl 74 (see FIG. 74), and imide 83 (see FIG. 23). Preferably, the derivatized surface is a composite derivatized surface.

FIG. 22 is an illustration of a BMI derivatization reaction mechanism that may be combined with an epoxy derivatization reaction mechanism of FIG. 23 and used in embodiments of the methods, such as method 500, disclosed herein. FIG. 23 is an illustration of an epoxy derivatization reaction mechanism that may be combined with a BMI derivatization reaction mechanism of FIG. 22 and that may be used in embodiments of the methods, such as method 500, disclosed herein. The hybridized molecular functional groups preferably comprise hydroxyl 76 (see FIG. 4A), maleimide 82 (see FIG. 4C), allyl 74 (see FIG. 74), and imide 83 (see FIG. 23). In particular, a cured surface 400*a* for BMI (bismaleimide) (see FIG. 22) and a derivatized surface 400*b* for BMI (see FIG. 22) have the hybridized molecular functional groups of allyl 74, maleimide 82, and hydroxyl 76 (see FIG. 22), and a cured surface 402*a* for epoxy (see FIG. 23) and a derivatized surface 402*b* for epoxy (see FIG. 23) have the hybridized molecular functional groups of hydroxyl 76 and imide 83 (see FIG. 23). The one or more vaporized chemical derivatization compounds may be deposited on the prepared surface via chemical vapor deposition, vacuum deposition, or another suitable deposition process. Preferably, the one or more chemical derivatization compounds may be deposited on the prepared surface via chemical vapor deposition, such as chemical vapor deposition in a vacuum bag set-up 450.

As shown in FIG. 30, with heat, the first and second liquid or solid phase chemical derivatization compounds 264a, 264b vaporize to become a first vaporized chemical derivatization compound 268a and a second vaporized chemical derivatization compound 268b. The first and second vaporized chemical derivatization compounds 268a, 268b travel along respective paths 270a, 270b and over the surface 454 of the substrate 452 to react and deposit to form the derivatized surface having hybridized molecular functional groups on the substrate 452. Any of the vaporized chemical derivatization compounds 268a, 268b that are unreacted travel along the respective paths 270a, 270b and through a vacuum port 272 and an opening 274 in the vacuum bag 256. The vacuum port 272 comprises a first portion 276 attached above the vacuum bag 256 and a second portion 278 attached below the vacuum bag 256. Unreacted vaporized chemical derivatization compounds 280a, 280b escape out of the vacuum port 272 and out of the vacuum bag set-up 250. Preferably, the surface 454 that has been prepared of the structure 452 or substrate may be exposed to the first and second vaporized chemical derivatization compound 268a, 268b containing selected functional groups. For composites, the selection of the functional groups is preferably based on the composite structure, for example. In particular, for composite structures made of bismaleimide, it has been unexpectedly found that the chemical derivatization compound pentafluorophenol 90 (see FIG. 22) forms carbon-carbon double bond functional groups on the derivatized surface 400b of the BMI (bismaleimide) (see FIG. 22). For composite structures made of epoxy, it has been unexpectedly found that the chemical derivatization compound pentafluorophenol 90 (see FIG. 23) and forms carbon-carbon double bond functional groups on the derivatized surface 402b of the epoxy (see FIG. 23).

The method 500 further comprises step 512 of heat curing the derivatized surface to form a high temperature hybridized molecular functional group adhesion barrier coating. The allyl 74, maleimide 82, and hydroxyl 76 hybridized molecular functional groups of the derivatized surface 400b of the BMI (see FIG. 22) combine with the hydroxyl 76 and imide 83 (see FIG. 23) of the derivatized surface 402b of the epoxy (see FIG. 23) to form a high temperature hybridized molecular functional group adhesion barrier coating.

The curing heat applied to the derivatized surface is preferably in a temperature range of from about 350 degrees Fahrenheit to about 500 degrees Fahrenheit. However, the curing heat may be dependent on the bonding temperature and the bonding temperature may be dependent on the adhesive used for bonding. The curing heat may be initially ramped up to about 350 degrees Fahrenheit at a rate of about 2 degrees Fahrenheit to 5 degrees Fahrenheit per minute. The curing heat may then be held or maintained at about 350 degrees Fahrenheit for an effective time of about 240 minutes. However, the effective time for holding the curing heat may be more or less depending on the bonding time and temperature, which may be dependent on the adhesive used for bonding. The derivatized surface may be post-cured at a higher curing heat temperature, such as in a temperature range of from about 450 degrees Fahrenheit to about 500 degrees Fahrenheit. The structure with the heat cured derivatized surface, in the form of the high temperature hybridized molecular functional group barrier coating, is then preferably cooled on its own or with a cooling element or device (not shown). Preferably, the structure with the heat cured derivatized surface, in the form the high temperature hybridized molecular functional group barrier coating, is cooled to a temperature below about 120 degrees Fahrenheit at a rate of about 2 degrees Fahrenheit to about 5 degrees Fahrenheit per minute.

After the heating and cooling curing temperature cycle, the structure with the heat cured and cooled derivatized surface, in the form of the high temperature hybridized molecular functional group barrier coating, is removed from the treatment vessel. The structure with the heat cured and cooled derivatized surface, in the form of the high temperature hybridized molecular functional group barrier coating, may then be layed up into adhesive joints upon removal from the treatment vessel and may then be bonded to another structure. The method 500 may further comprise applying an adhesive layer 46 (see FIG. 2C) to the high temperature hybridized molecular functional group barrier coating. As discussed above, the adhesive layer 46 may preferably comprise film adhesives, such as epoxies, bismaleimides, or another suitable adhesive. The method 500 may further comprise joining structures together with the adhesive layer 46. The method 500 may further comprise heat curing the adhesive layer 46 to the joined structures 172, 176 (see FIG. 2F) to form an aircraft structural bond 180 (see FIG. 2F) between the structures 172, 176.

The high temperature hybridized molecular functional group barrier coating is preferably resistant to high heat temperatures in a range of from about 350 degrees Fahrenheit to about 2000 degrees Fahrenheit. The high temperature hybridized molecular functional group barrier coating is preferably a thermally protective, toughened adhesion coating that mitigates effects of a hostile operating environment.

In another embodiment of the disclosure, there is provided a method of applying a high temperature hybridized molecular functional group adhesion barrier coating to a surface of a composite structure, in particular. The method is similar to method 500 discussed above but is directed to application to a composite surface of a composite structure. The composite structure is preferably made of a polymeric material comprising bismaleimides (BMI), epoxies, polyimides, a combination thereof, or another suitable polymeric material. The method comprises preparing a composite surface of a composite structure to expose active reactive surface sites. The composite surface is preferably prepared with one or more surface preparation treatments comprising hand sanding, machine sanding, sandblasting, solvent wiping, abrading, grit blasting, chemical cleaning, and chemical etching. More preferably, the composite surface is prepared with hand sanding. The method further comprises positioning the composite structure in a derivatization chamber.

The method further comprises positioning one or more liquid or solid phase chemical derivatization compounds, such as first liquid or solid phase chemical derivatization compound 264a and second liquid or solid phase chemical derivatization compounds 264b (see FIG. 30) in the derivatization chamber, such as a vacuum bag 256, in chemical vapor deposition vacuum bag set-up 450 (see FIG. 30). The one or more liquid or solid phase chemical derivatization compounds preferably consists of pentafluorophenol, allyl pentafluorobenzene, tridecafluorononyl maleimide, glycidyl octafluoropentyl ether, fluorinated compounds, or another suitable chemical derivatization compounds. More preferably, the chemical derivatization compound is pentafluorophenol.

As discussed above with respect to method 500, the method for the composite similarly further comprises sealing the derivatization chamber. The method further comprises applying heat to the one or more liquid or solid phase chemical derivatization compounds to vaporize the one or more liquid or solid phase chemical derivatization compounds. The method further comprises flowing the one or more vaporized chemical derivatization compounds over the prepared composite surface. The method further comprises depositing the one or more vaporized chemical derivatization compounds on the prepared composite surface to form a derivatized composite surface having hybridized molecular functional groups.

As discussed above with respect to method 500, the method for the composite similarly further comprises heat curing at an effective curing heat temperature for an effective curing heat time the derivatized composite surface to form a high temperature hybridized molecular functional group adhesion barrier coating. The effective curing heat temperature is preferably a temperature in a range of from about 350 degrees Fahrenheit to about 500 degrees Fahrenheit. However, the effective curing heat temperature may be dependent on the bonding temperature, and the bonding temperature may be dependent on the adhesive used for bonding. The effective curing heat temperature may be initially ramped up to about 350 degrees Fahrenheit at a rate of about 2 degrees Fahrenheit to about 5 degrees Fahrenheit per minute. The effective curing heat temperature may then be held or maintained at about 350 degrees Fahrenheit for an effective curing heat time of about 240 minutes. However, the effective curing heat time for holding the effective curing heat temperature may be more or less depending on the bonding time and temperature, which may be dependent on the adhesive used for bonding. The derivatized surface may be post-cured at a higher curing heat temperature, such as at a temperature in a range of from about 450 degrees Fahrenheit to about 500 degrees Fahrenheit. The structure with the heat cured derivatized surface, in the form of the high temperature hybridized molecular functional group barrier coating, is then preferably cooled on its own or with a cooling element or device (not shown). Preferably, the structure with the heat cured derivatized surface, in the form the high temperature hybridized molecular functional group adhesion barrier coating, is cooled to a temperature below about 120 degrees Fahrenheit at a rate of about 2 degrees Fahrenheit to about 5 degrees Fahrenheit per minute. The method further comprises cooling the derivatized composite surface having the formed high temperature hybridized molecular functional group adhesion barrier coating.

Preferably, the high temperature hybridized molecular functional group adhesion barrier coating is resistant to high heat temperatures in a range of from about 350 degrees Fahrenheit to about 2000 degrees Fahrenheit. Preferably, the high temperature hybridized molecular functional group barrier coating is a thermally protective, toughened adhesion coating that mitigates effects of a hostile operating environment.

In another embodiment of the disclosure, there is provided a high temperature hybridized molecular functional group adhesion barrier coating for a composite structure. The coating comprises one or more hybridized molecular functional groups, discussed above in connection with the method 500, attached to a composite surface of a composite structure, wherein the one or more hybridized molecular functional groups are hybridized through a chemical derivatization process. The hybridized molecular functional groups preferably comprise hydroxyl, maleimide, allyl, imide, or another suitable functional group. The coating further comprises one or more chemical derivatization compounds attached to the one or more hybridized molecular functional groups via a condensation reaction. The chemical derivatization compound preferably consists of pentafluorophenol, allyl pentafluorobenzene, tridecafluorononyl maleimide, glycidyl octafluoropentyl ether, fluorinated compounds, or another suitable chemical derivatization compound. The coating is preferably resistant to high heat temperatures in a range of from about 350 degrees Fahrenheit to about 2000 degrees Fahrenheit, and the coating is preferably a thermally protective, toughened adhesion coating that mitigates effects of a hostile operating environment. The composite structure preferably comprises a polymeric material such as bismaleimides (BMI), epoxies, polyimides, a combination thereof, or another suitable polymeric material. The composite structure is preferably an aircraft structure.

Figure 29:
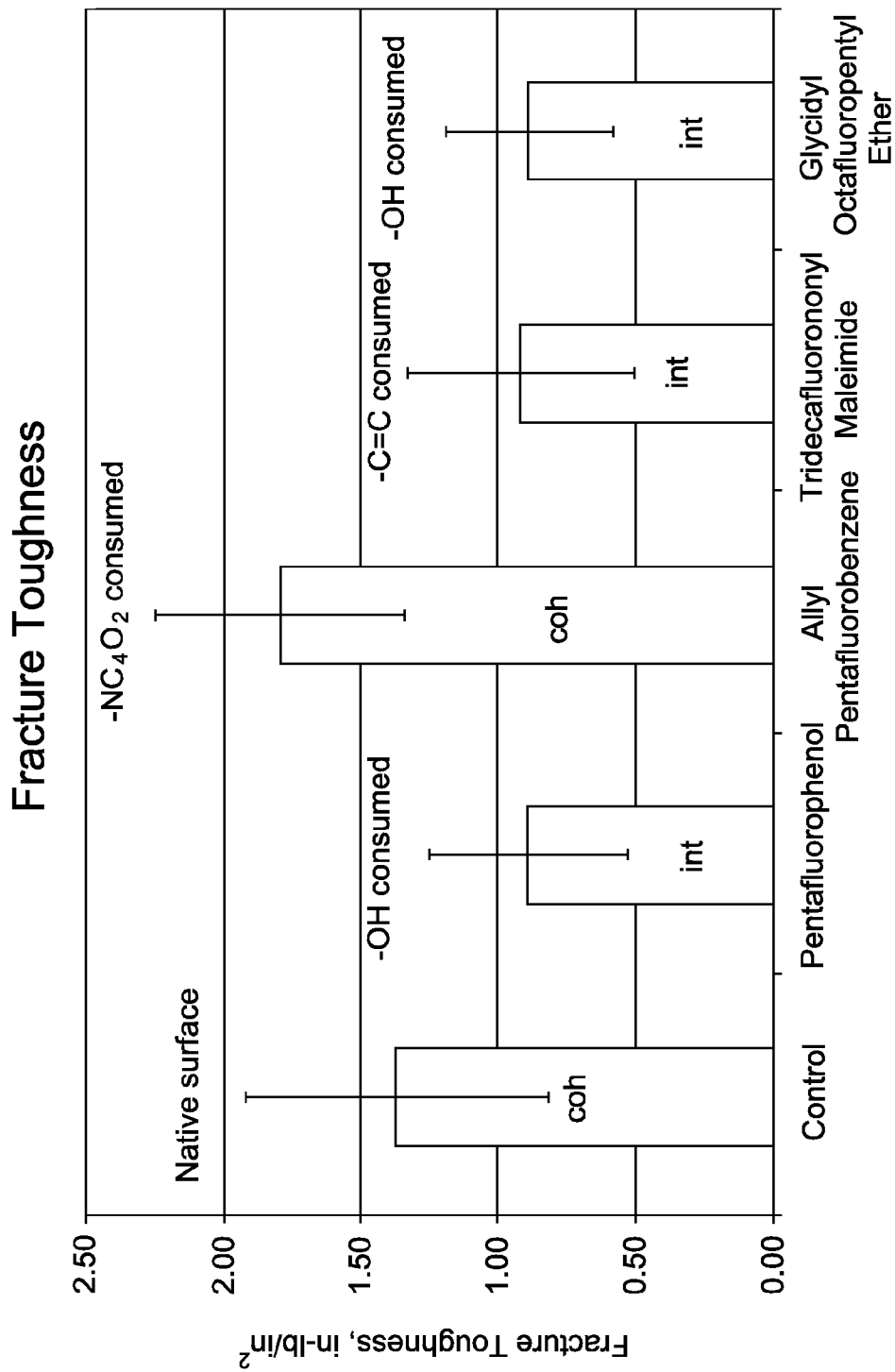
FIG. 29 is an illustration of a graph showing adhesive fracture toughness results for bonded to functionalized surfaces.

FIG. 24 is an illustration of a table listing atomic compositions of model chemical derivatization compounds deposited on a BMI surface. FIG. 25 is an illustration of a table listing atomic compositions of elements of the model chemical derivatization compounds deposited on an epoxy derivatized surface and a BMI derivatized surface. FIG. 26 is an illustration of a table listing the effect of derivatization on surface energy for various derivatizing agents. In general, surface energy changes with derivatization were small. The longest chain fluorocarbon compound (tridecafluorononyl maleimide) reduced surface energy by 32%. FIG. 27 is an illustration of a table listing surface characterization for surface energy of epoxy and BMI control and derivatized surfaces. Surface energy was measured in mJ/m$^2$ (meter-Joule) per meter squared. FIG. 28 is an illustration of a table listing reactive surface sites on BMI for various derivatizing agents. The hydroxyls were shown to be the predominant reactive functional group. Large, sterically hindered molecules grafted at lower areal density. The allylic (C=C) also presented in significant amounts. The more fluorine that was in the model compound, the more hydroxyl was formed. FIG. 29 is an illustration of a graph showing adhesive fracture toughness results for bonded to functionalized surfaces. The allylic group with (C=C) had an effect on fracture toughness and the hydroxyl (OH) group had an effect on fracture toughness. Consuming surface maleimides had no effect on fracture behavior. Consuming hydroxyls or allylic groups shifted failure to interface and reduced toughness.

Disclosed embodiments of the method 500 and coating provide an adhesion barrier coating for transforming a high temperature structure's surface using hybridized or molecular functional groups which have an affinity to improve toughness, thermal oxidative degradation, high temperature property retention and sustainability of the structure under high temperature, hostile operating environments. A multifunctional structural barrier coating is achieved by introducing hybridized co-polymer resistive functional groups through derivatization reaction mechanisms on the structure's surface for high temperature applications such as military aircraft exhaust, engine propulsion systems, commercial wing box lining for fuel cells, and electromagnetic coatings for lightning strike protection for aircraft. In particular, the deposition of the multiple layer-by-layer (hybridized) formation of hydroxyl-maleimide-allylic functional groups on composite (e.g., bismaleimide (BMI) and epoxy), and metallic surfaces through derivatization reactions has resulted in structurally toughened, high temperature durable barrier coating adhesion bonding that may be used on aircraft structures, such as nacelles, engines, fuel tanks, and other structures requiring high temperature performance.

A variety of hybridized covalent functional groups may be responsible for successful high temperature protection and an effective structural adhesion barrier coating for engine nacelles and other critical high temperature aerospace structures. The adhesion barrier coating retains high temperature, complex hydroxyl-maleimide-allylic covalent bonding forces and secondary bonding forces which increase the long-life of the high temperature composite structure's surface. Primary covalent bonding forces may include the reinforced hydroxyl-maleimide-allylic functional groups created between the composite or metallic surface and the hostile operating environment, which results in increased structural life cycle. Additionally, it is believed that secondary attraction forces have a significant contribution to durable, long-term high temperature structural barrier protection. Secondary forces, as well as mechanical interlock and covalent bonding, create the final structural protection. The disclosed method 500 and coating exploit the limited mechanical interlocking and improved adhesion created by sanding or grit blasting. In addition, activating critical molecular co-functional groups', such as hydroxyl-maleimide-allylic, functionality for structural BMI, epoxies, and super alloys among others, maximize the resulting high temperature-stable, covalent layer. Such processes may produce greater resistance to mechanical interlocking at the structural adhesion barrier coating interface. Increased surface energy due to the unique high temperature multifunctional covalent functional groups improve the wettability of the adhesion barrier coating molecular layer and contribute to the long-term durability, resulting in an enhanced mechanical lock between structural composite or metallic members not previously seen in industry.

Further, the disclosed method 500 and coating use chemical derivatization to create a high temperature hybridized molecular functional group adhesion barrier coating that may act as a promoter-type layer on the structural composite surface and as a bonding agent. Multiple-hybridized-layer depositions of derivatizing high temperature functional groups at otherwise inactive sites on the structural composite or metallic surface create an adhesion barrier coating like multiple thin film layers (toughened high temperature coating adhesion barrier) that promote adhesion and result in the innovative protective hybridized molecular layer. Such environmentally toughened, hybridized co-polymer functional groups on the structural surface act as a molecular adhesion barrier coating layer and thus improve the adhesion, which may account for increased structural, high temperature resistance. This, in turn, may result in increased structure life, damage tolerance, and durability.

The disclosed method 500 and coating is suitable for high temperature environments that can provide adhesion promotion for structural bonding and minimize thermal oxidative degradation, without impacting structure life, damage tolerance, and durability. The disclosed method 500 and coating provide for a high temperature, toughened, protective coating layer that may be applied to many composite, metallic, or ceramic surfaces, such as graphite/epoxy, graphite/bismaleimide, graphite/polyimide, super alloys, high temperature titanium alloys, ceramics, and other suitable surfaces. The disclosed method 500 and coating provide for a high temperature adhesion barrier coating method and coating for transforming a composite, metallic, or ceramic structural surface from a limited active surface to a highly activated, high temperature derivatized adhesion barrier coating of toughened-protective coating surface characteristics. This transformed surface has an ability to mitigate high temperature induced structural damage such as loss of strength and damage tolerance. Further, the method 500 and coating provide for a high temperature barrier coating for a composite structure comprising vapor phase deposition of a derivatizing compound that allows specific derivatization reaction on a composite surface.

The disclosed method and coating may also have the potential for significant cost savings during manufacture and production. The savings potential lies in the reduction of scrapping or reworking, and increased composite structural damage tolerance and durability across all structures that may experience aggressive high temperatures.

EXAMPLES

Tests were conducted with various derivatization compounds or agents on bismaleimide (BMI) composite surface substrates as follows:

Example 1

Comparative Surface Preparation Tests of Bismaleimide (BMI) Samples

Figure 10:
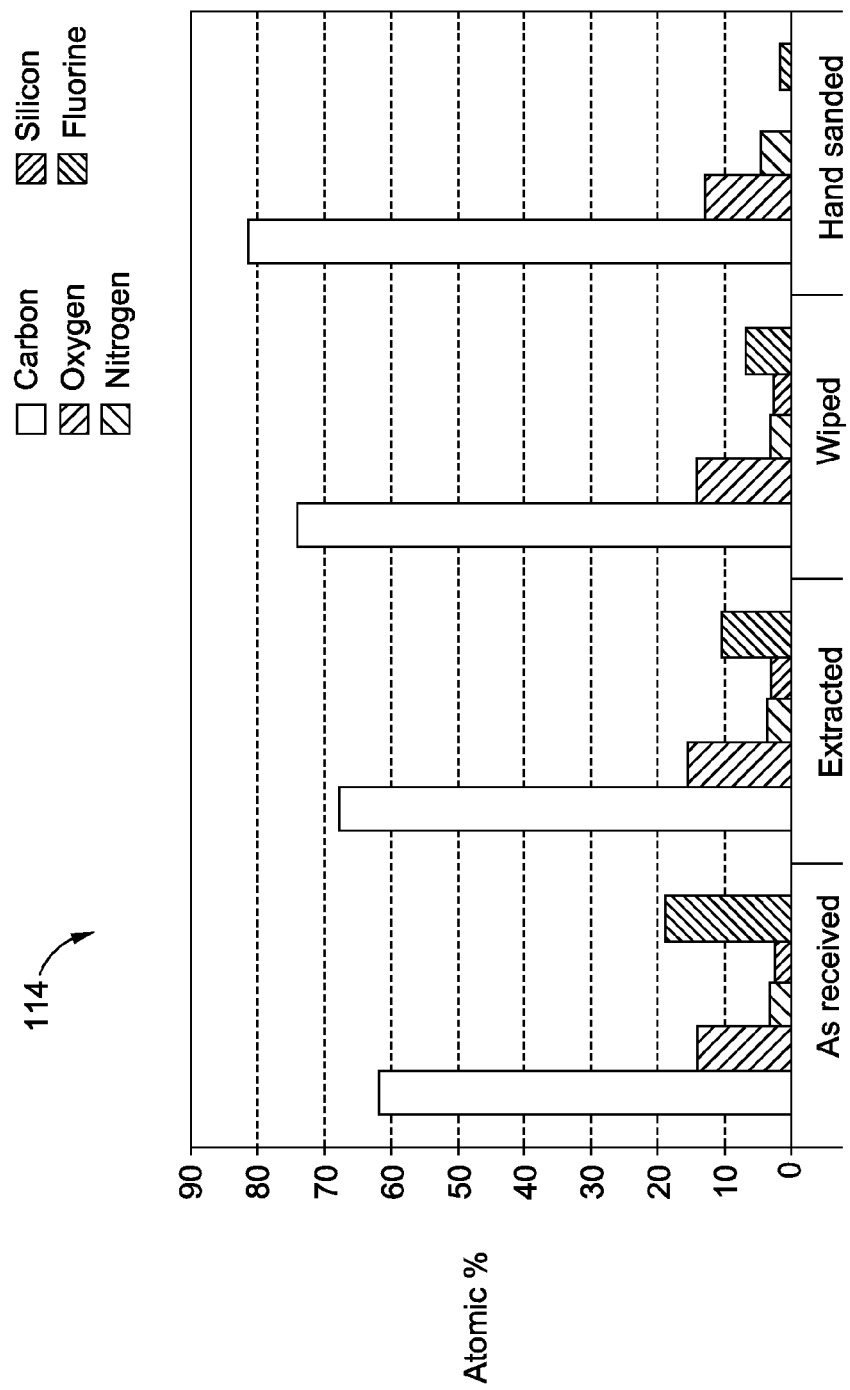
FIG. 10 is an illustration of a graph comparing bismaleimide surface compositions after various surface preparation treatments.

Four (4) samples of bismaleimide (BMI) composite surface substrates were prepared, tested and evaluated using various surface preparation treatments, including: (1) "As received" which means the BMI composite surface had no surface preparation and the BMI composite surface had no exposure; (2) "Extracted" which means the BMI composite surface was washed with acetone solvent and then dried; (3) "Wiped" which means the BMI composite surface was hand wiped with an acetone silk cloth; and, (4) "Hand sanded" which means the BMI composite surface was hand sanded with 60 grit aluminum oxide sandpaper until black dust has been produced and a top layer of the BMI composite matrix material was removed with the hand sanding. An X-ray photoelectron spectroscopy (XPS) machine (Model SSX-100) obtained from Surface Sciences Inc. of Brea, Calif., was used to measure the concentrations of carbon (C), oxygen (O), nitrogen (N), silicon (Si), and fluorine (F) present after each of the surface preparations was conducted. FIG. 10 is an illustration of a graph 114 comparing bismaleimide surface compositions after the various surface preparation treatments, "As received", "Extracted", "Wiped", and "Hand sanded". The results of this test showed that hand sanding of a BMI composite surface alone removed contaminants and also introduced carbon species on the surface of the BMI composite. This was likely due to the exposure of carbon fibers that are typical of carbon-epoxy composites.

Example 2

Comparative Surface Preparation Tests of Bismaleimide (BMI) Samples with Addition of TFAA (Tetrafluoroaceticanhydride)

Figure 11:
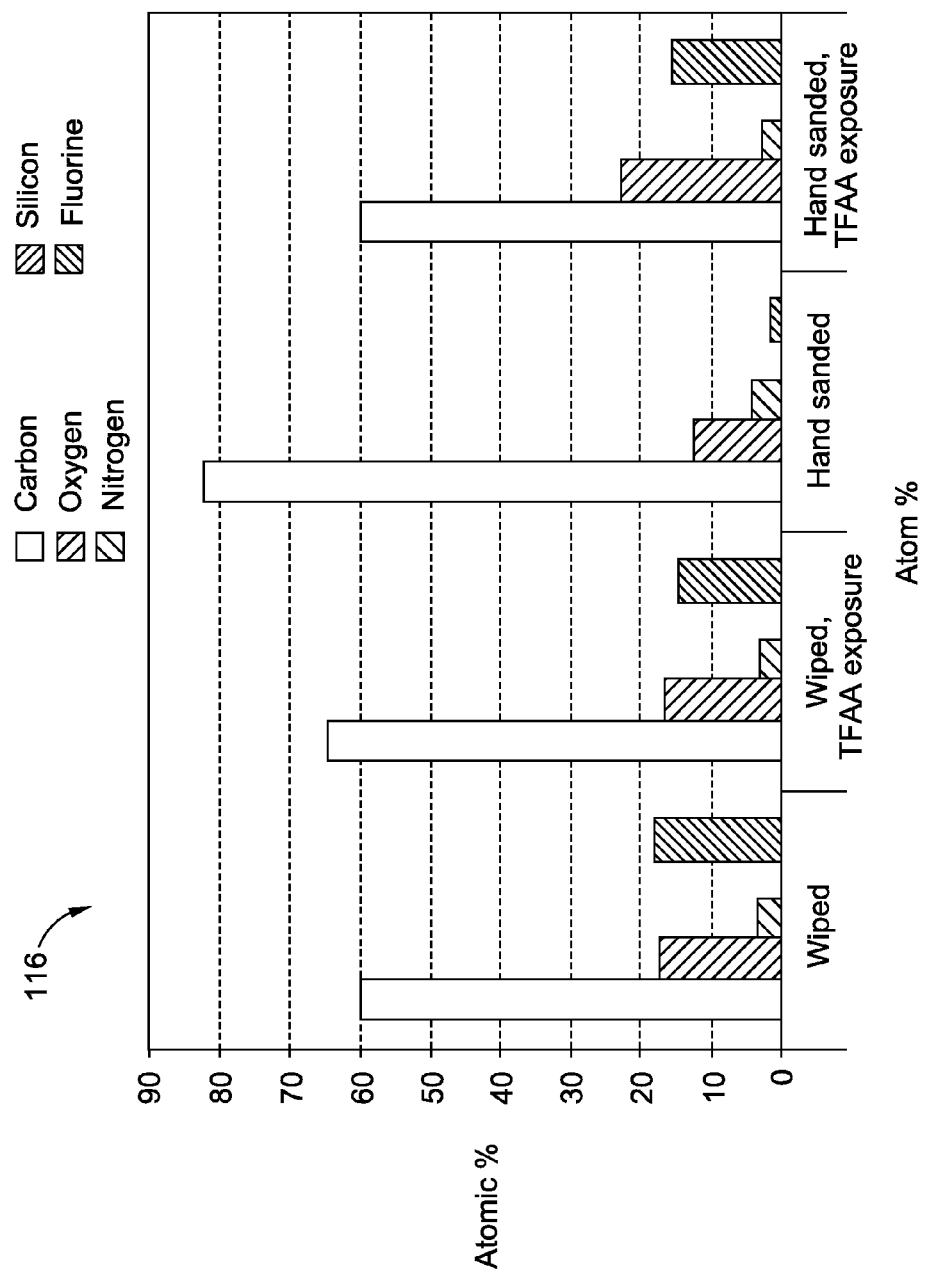
FIG. 11 is an illustration of a graph comparing bismaleimide surface compositions before and after tetrafluoroaceticanhydride (TFAA) exposure.

Four (4) samples of bismaleimide (BMI) composite surface substrates were prepared, tested and evaluated using wiped and hand sanded surface preparation treatments before and after exposure to TFAA, including: (1) "Wiped" with isopropyl alcohol (IPA) which means the BMI composite surface was hand wiped with an isopropyl alcohol (IPA) soaked silk cloth; (2) "Wiped, TFAA exposure" which means the BMI composite surface was hand wiped with an isopropyl alcohol (IPA) soaked silk cloth and then the wiped BMI composite surface was treated with chemical derivatization compound TFAA; (3) "Hand sanded" which means the BMI composite surface was hand sanded with 60 grit aluminum oxide sandpaper until black dust has been produced and a top layer of the BMI composite matrix material was removed with the hand sanding; and (4) "Hand sanded, TFAA exposure" which means the BMI composite surface was hand sanded with a 60 grit aluminum oxide sandpaper until black dust has been produced and a top layer of the BMI composite matrix material was removed with the hand sanding, and then the exposed BMI composite surface was treated with chemical derivatization compound TFAA. An X-ray photoelectron spectroscopy (XPS) machine (Model SSX-100) obtained from Surface Sciences Inc. of Brea, Calif., was used to measure the concentrations of carbon (C), oxygen (O), nitrogen (N), silicon (Si), and fluorine (F) present after each of the surface preparations was conducted. FIG. 11 is an illustration of a graph 116 comparing BMI composite surface compositions before and after TFAA exposure for BMI surface compositions with surface preparation treatments, "Wiped", "Wiped, TFAA exposure", "Hand sanded", and "Hand sanded, TFAA exposure". The results of this test showed that hand sanding activated the BMI composite surface toward TFAA grafting. After treatment with TFAA, the results showed some carbon was consumed and oxygen and fluorine concentrations increased. The results of increased oxygen during the TFAA derivatization process demonstrated improved availability of reactive species on the BMI composite surface and improved covalent and Van der Waals forces during the composite-to-composite bonding process.

Example 3

Derivatization of Sanded Bismaleimide (BMI) Samples with Fluorinated Derivatization Compounds Five (5) samples of bismaleimide (BMI) composite surface substrates were prepared, tested and evaluated using hand sanding surface preparation treatment and exposure to various fluorinated derivatization compounds. Each of the BMI substrate samples was prepared by first solvent wiping with acetone to remove handling contamination. Each of the BMI substrate samples was then hand sanded with 60 grit aluminum oxide sandpaper until black dust was produced. Each of the BMI substrate samples was then wiped with acetone and KIMWIPES (KIMWIPES is a registered trademark of Kimberly-Clark Corporation of Neenah, Wis.) followed by wiping with dry KIMWIPES until all of the sanding debris was removed. Each of four (4) BMI substrate samples was exposed to a different fluorinated derivatization compound vapor by suspending each of the four (4) BMI samples over a different fluorinated derivatization compound sealed in glass vials. The four (4) fluorinated derivatization compounds included: (1) pentafluorophenol; (2) allyl pentafluorobenzene; (3) tridecafluorononylmaleimide; and (4) glycidyloctafluoropentyl ether. The fifth BMI substrate sample was a control and was only hand sanded and was not exposed to a fluorinated derivatization compound. The four (4) BMI samples exposed to the fluorinated derivatization compounds and the one control BMI sample were exposed to the same cure cycle as adhesive, that is, the temperature was ramped up from room temperature to 177° C. (degrees Celsius) over 100 minutes, held at 177° C. for 240 minutes, and cooled down at room temperature. The BMI samples were post-cured using the following schedule: ramped up to 227° C. over 100 minutes, held 360 minutes, and cooled down. X-ray photoelectron spectroscopy (XPS) was performed to determine whether any bonding took place. The samples were removed from the glass vials, immediately placed in an X-ray photoelectron spectroscopy (XPS) sample introduction chamber (~(approximately) 10-6 torr), and allowed to outgas overnight. The samples were then gently heated for 20 (twenty) minutes with an ultraviolet (UV) heat lamp in the introduction chamber to drive off any physisorbed (physically adsorbed) fluorinated derivatization compounds. The samples were grounded with carbon tape to allow resin and fiber signals to be resolved. Flooding the sample surfaces with low energy electrons allowed for data from conductive fibers to be separated from nonconductive resin.

Figure 12:
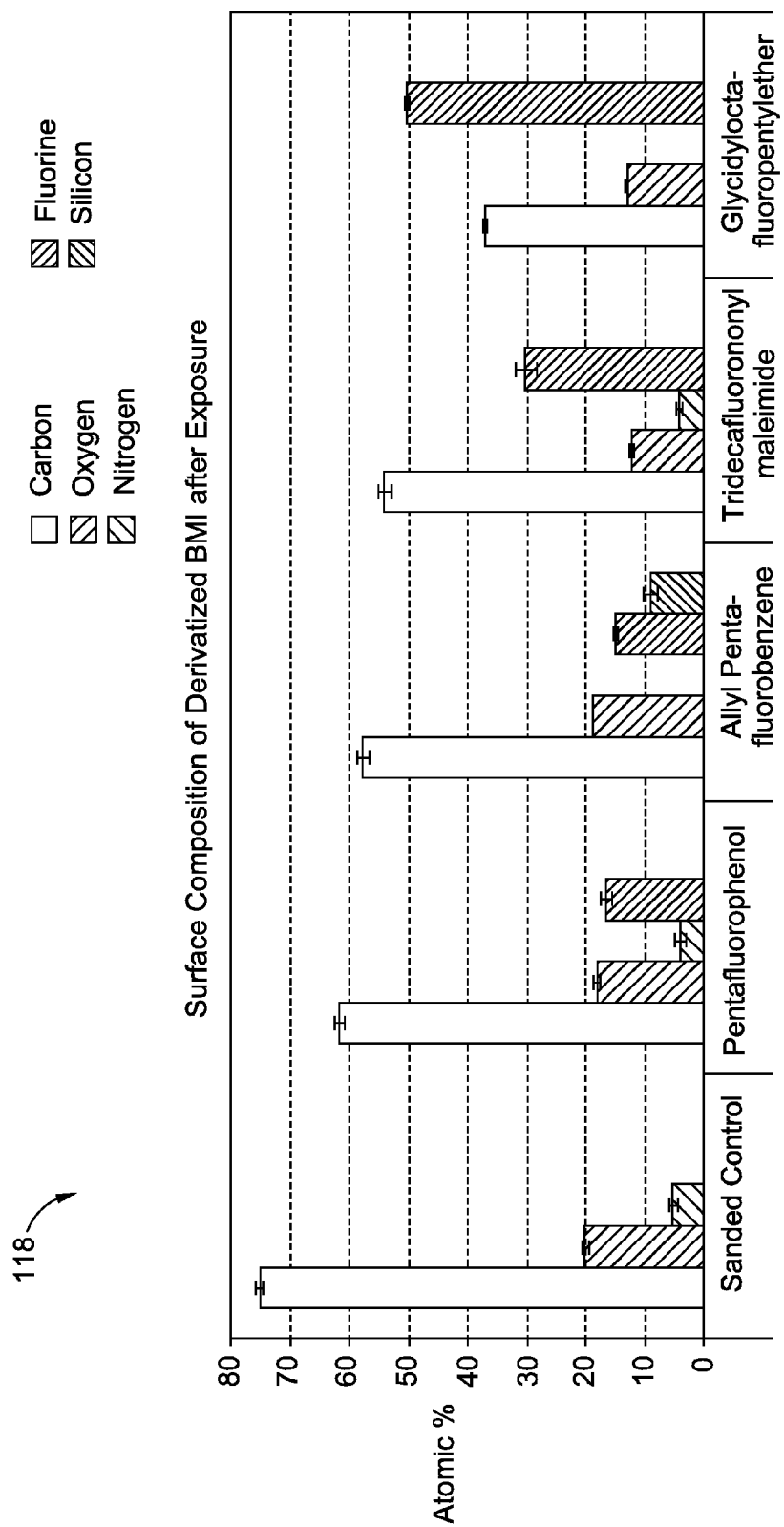
FIG. 12 is an illustration of a graph comparing derivatized bismaleimide surface compositions after exposure to various fluorinated chemical derivatization compounds.

FIG. 12 is an illustration of a graph 118 comparing the following: (1) BMI surface compositions of carbon, oxygen, and nitrogen for a "Sanded Control" BMI sample; (2) BMI surface compositions of carbon, oxygen, nitrogen, and fluorine for a sanded BMI sample exposed to fluorinated derivatization compound pentafluorophenol; (3) BMI surface compositions of carbon, oxygen, fluorine, and silicon for a sanded BMI sample exposed to fluorinated derivatization compound allyl pentafluorobenzene (there was an unknown source of silicon in the spectra of the allyl pentafluorobenzene-exposed surfaces); (4) BMI surface compositions of carbon, oxygen, nitrogen, and fluorine for a sanded BMI sample exposed to fluorinated derivatization compound tridecafluorononylmaleimide; and (5) BMI surface compositions of carbon, oxygen, nitrogen, and fluorine for a sanded BMI sample exposed to fluorinated derivatization compound glycidyloctafluoropentyl ether. The tests results showed evidence of all of the fluorinated derivatization compounds or derivatizing agents on the BMI surface after exposure and cure cycle. The allyl pentafluorobenzene-exposed sample showed significant silicon (Si) which was evidence of possible contamination. The allyl pentafluorobenzene-exposed sample and the glycidyloctafluoropentyl ether-exposed sample showed no nitrogen in the sampling depth which suggests that the derivatizing agent itself polymerized on the BMI surface to the extent that it covered or masked the nitrogen on the surface and nitrogen could not be detected via XPS. XPS typically only penetrates the first monolayer of the surface.

The test results indicated that each of the fluorinated derivatization compounds was chemically bonded to its respective sanded BMI surface sample. Exposed fibers and exposed resin surfaces appeared equally reactive toward all of the fluorinated derivatization compounds. The test results seemed to further indicate that exposed fiber surfaces played an important role in adhesion.

Example 4

Comparative Shear Strength Tests of Bismaleimide (BMI) Samples with Addition of Bromine and TFAA (Tetrafluoroaceticanhydride)

Figure 13:
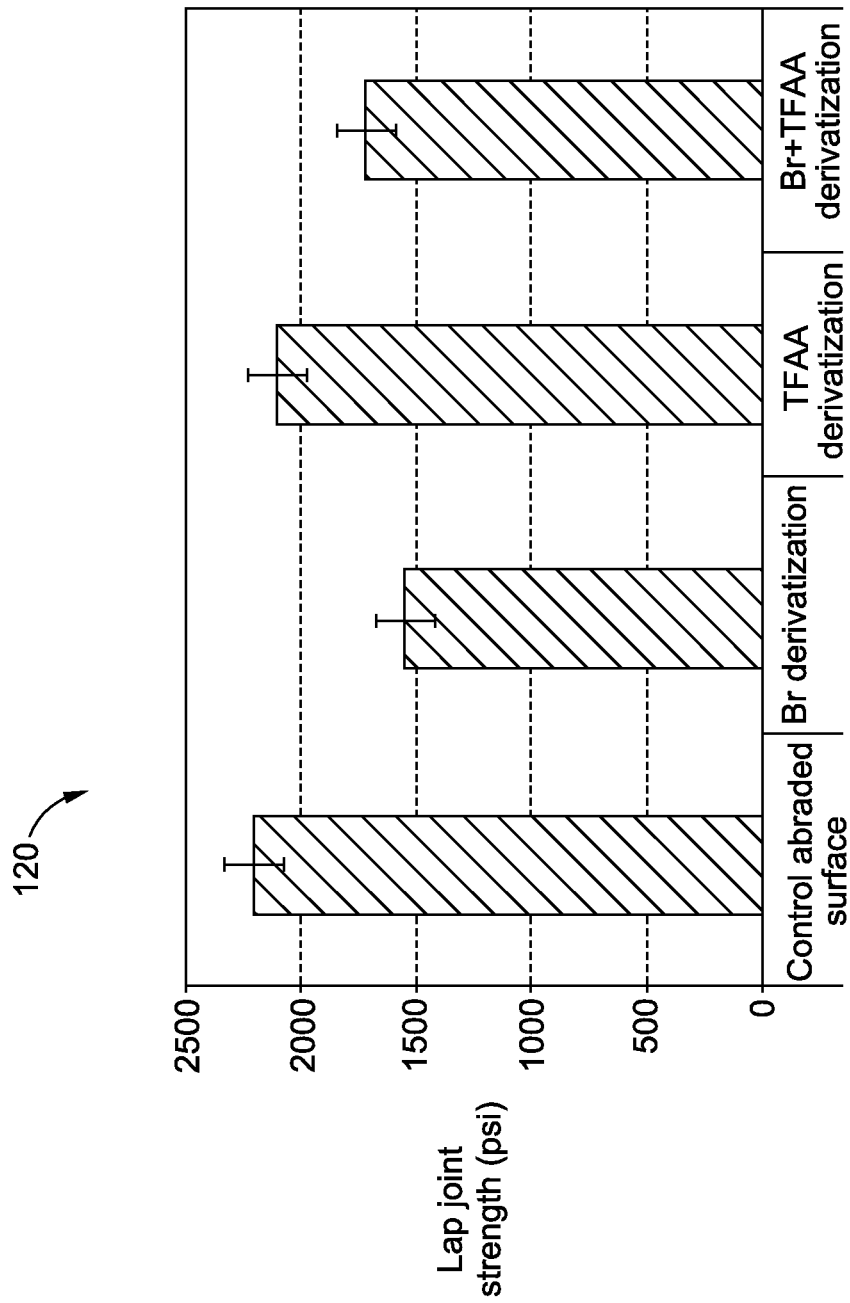
FIG. 13 is an illustration of a graph comparing the results of bromine and tetrafluoroaceticanhydride (TFAA) derivatization on shear strength of bismaleimide-adhesive joints.

Four (4) samples of bismaleimide (BMI) composite surface substrates were prepared, tested and evaluated for shear strength, including: (1) a BMI sample substrate that was a "Control abraded surface" with no exposure to a derivatization compound; (2) a BMI sample substrate that was first sanded and then exposed to bromine derivatization; (3) a BMI sample substrate that was first sanded and then exposed to TFAA derivatization; and (4) a BMI sample substrate that was first sanded and then exposed to bromine and TFAA derivatization. FIG. 13 is an illustration of a graph 120 comparing the results of the lap joint strength or shear strength in pounds per square inch (psi) for BMI samples for "Control abraded surface", "Br (Bromine) derivatization", "TFAA derivatization", and "Br plus TFAA derivatization". This test showed the impact of consuming functional groups on the bonding surface of a BMI composite surface. The test results showed that the consumption of units of unsaturation (double bonds) by bromination derivatization had direct impact on the shear strength of the resulting composite joint, that consumption of hydrolyl groups through TFAA derivatization had no appreciable effect, and that a combination of bromination and TFAA treatment had an appreciably negative effect on the joint's ultimate shear strength. This suggested that promotion of carbon-carbon double bonds through derivatization increased the performance of the bonded joint.

Example 5

Binding Energy Tests for BMI Samples Exposed to Fluorinated Derivatization Compounds Binding energy tests were performed on the BMI samples of Example 3 above that were exposed to various fluorinated derivatization compounds. The binding energy tests were measured by X-ray photoelectron spectroscopy (XPS). XPS measures the energy of electrons displaced from the sample surface via X-ray impingement. The energy of the displaced electrons is measured as they come off the surface. This energy represents the binding energy of the electrons on the surface, approximately: X-ray energy in minus electron energy out plus binding energy equals zero (0).

Figure 14:
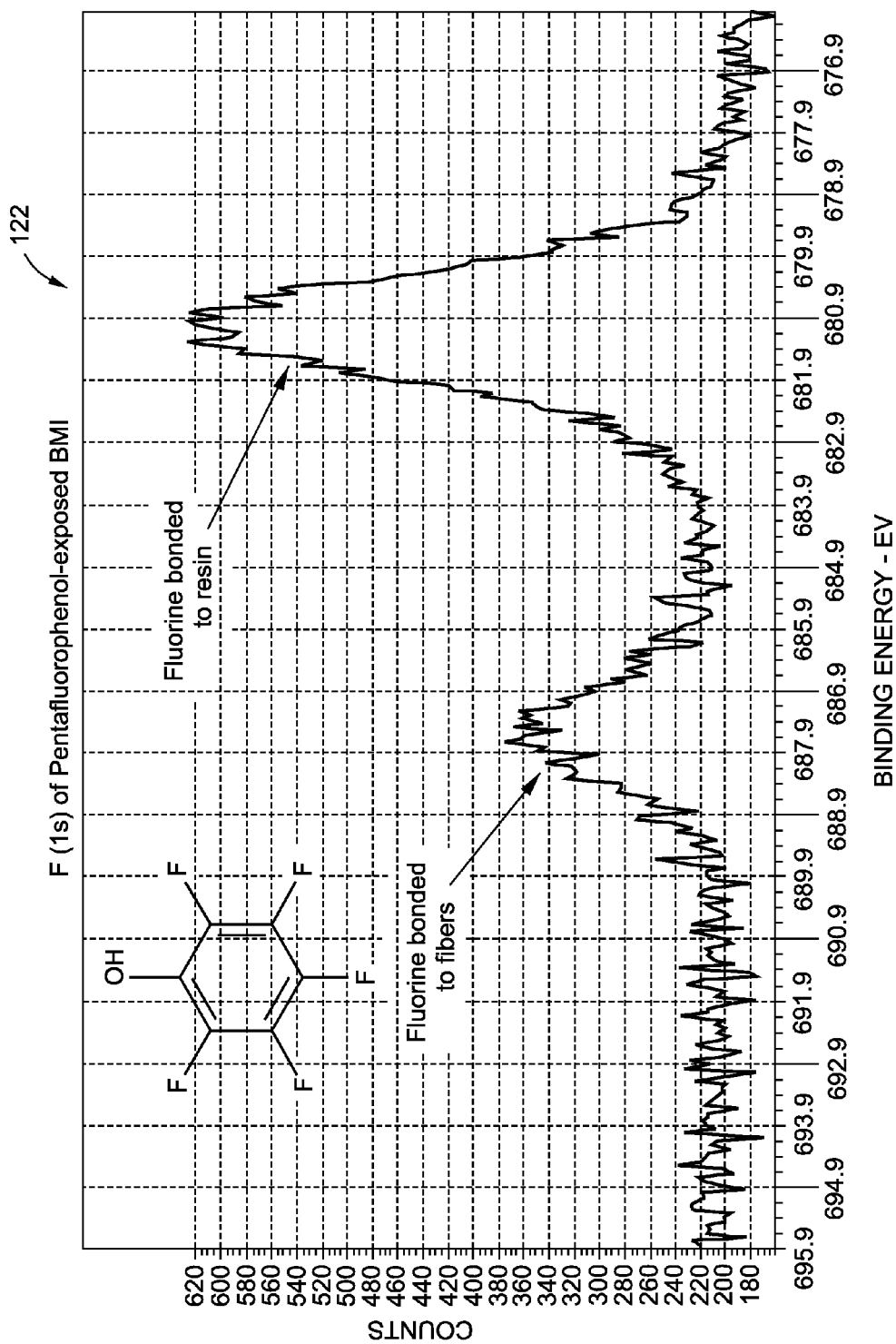
FIG. 14 is an illustration of a graph showing the results of the binding energy of fluorine of pentafluorophenol to resin and fibers of a derivatized bismaleimide surface.

FIG. 14 is an illustration of a graph 122 showing the results of the binding energy test for F (fluorine) (1 s) of the pentafluorophenol-exposed BMI sample. The test results showed fluorine from the pentafluorophenol derivatization compound bonded to fibers and bonded to resin of the derivatized bismaleimide surface. There was evidence of hydroxyl grafting to both resin and fiber surfaces of the BMI sample. BMI adhesive appeared to adhere covalently to both resin and fiber surfaces of the BMI sample.

Figure 15:
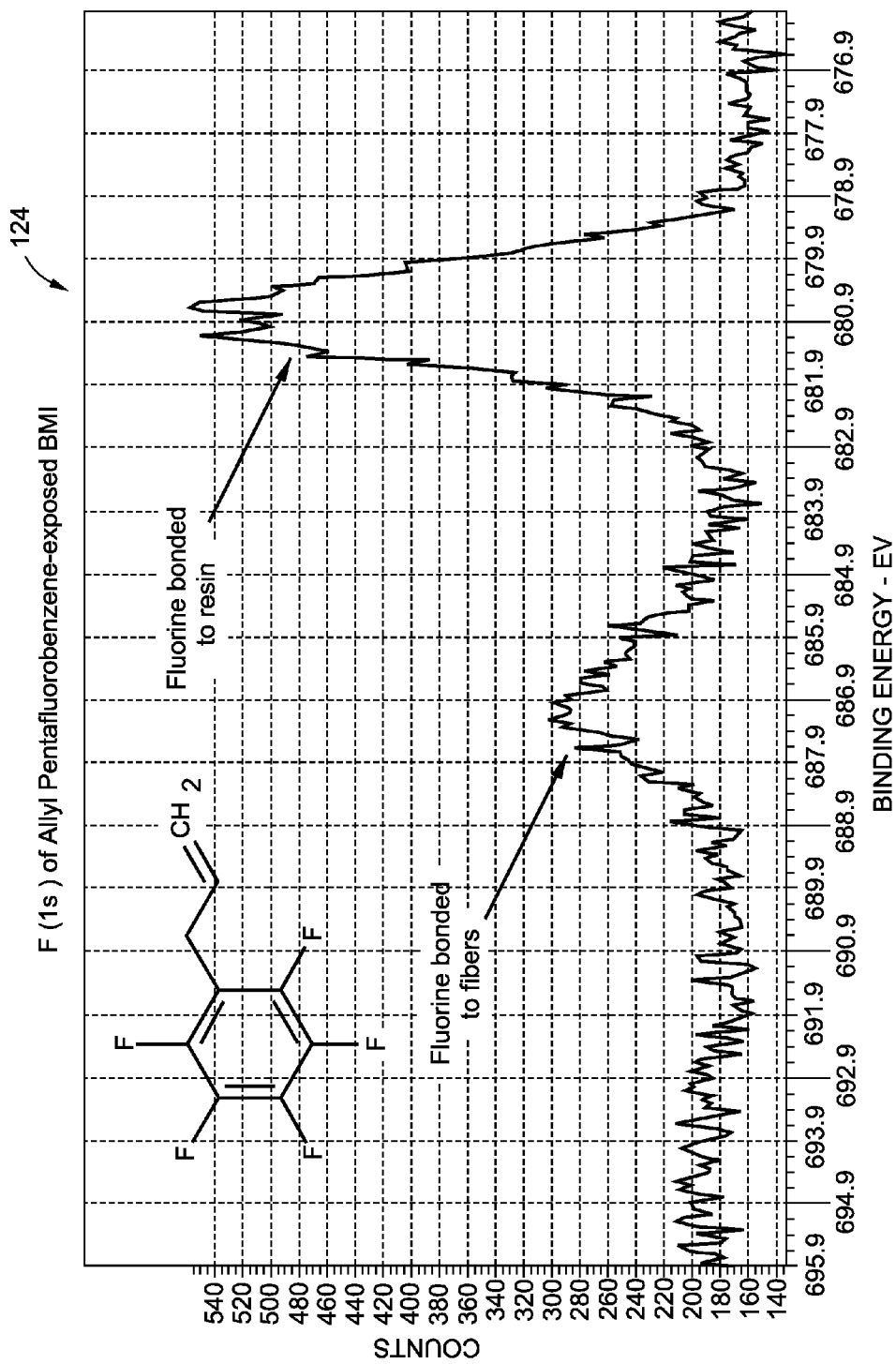
FIG. 15 is an illustration of a graph showing the results of the binding energy of fluorine of allyl pentafluorobenzene to resin and fibers of a derivatized bismaleimide surface.

FIG. 15 is an illustration of a graph 124 showing the results of the binding energy test for F (fluorine) (1 s) of the allyl pentafluorobenzene-exposed BMI sample. The test results showed fluorine from the allyl pentafluorobenzene derivatization compound bonded to fibers and bonded to resin of the derivatized bismaleimide surface. There was evidence of allyl grafting to both resin and fiber surfaces of the BMI sample. BMI adhesive appeared to adhere covalently to both resin and fiber surfaces of the BMI sample.

Figure 16:
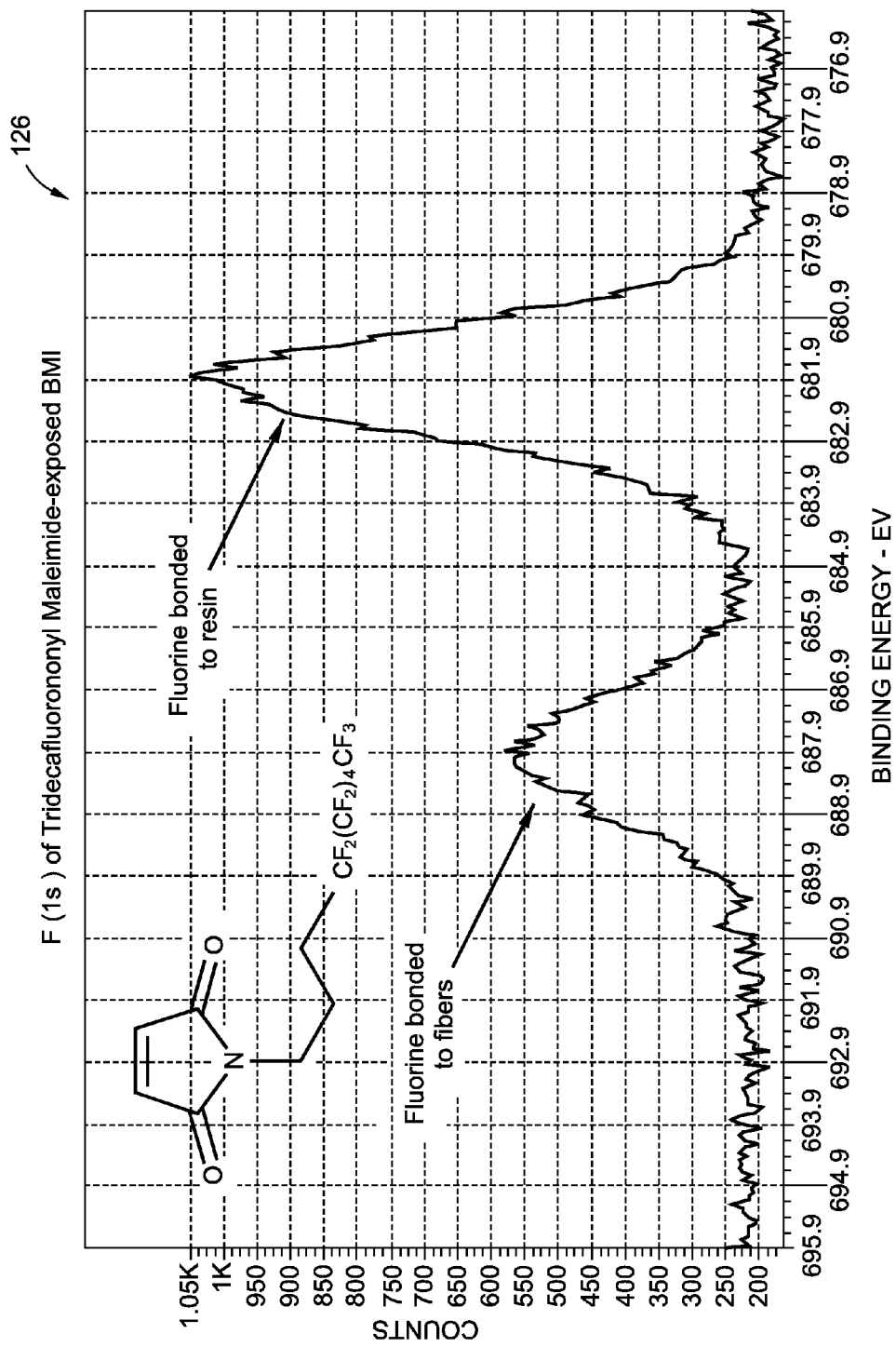
FIG. 16 is an illustration of a graph showing the results of the binding energy of fluorine of tridecafluorononyl maleimide to resin and fibers of a derivatized bismaleimide surface.

FIG. 16 is an illustration of a graph 126 showing the results of the binding energy test for F (fluorine) (1 s) of the tridecafluorononyl maleimide-exposed BMI sample. The test results showed fluorine from the tridecafluorononyl maleimide derivatization compound bonded to fibers and bonded to resin of the derivatized bismaleimide surface. There was evidence of maleimide grafting to both resin and fiber surfaces of the BMI sample. BMI adhesive appeared to adhere covalently to both resin and fiber surfaces of the BMI sample.

Figure 17:
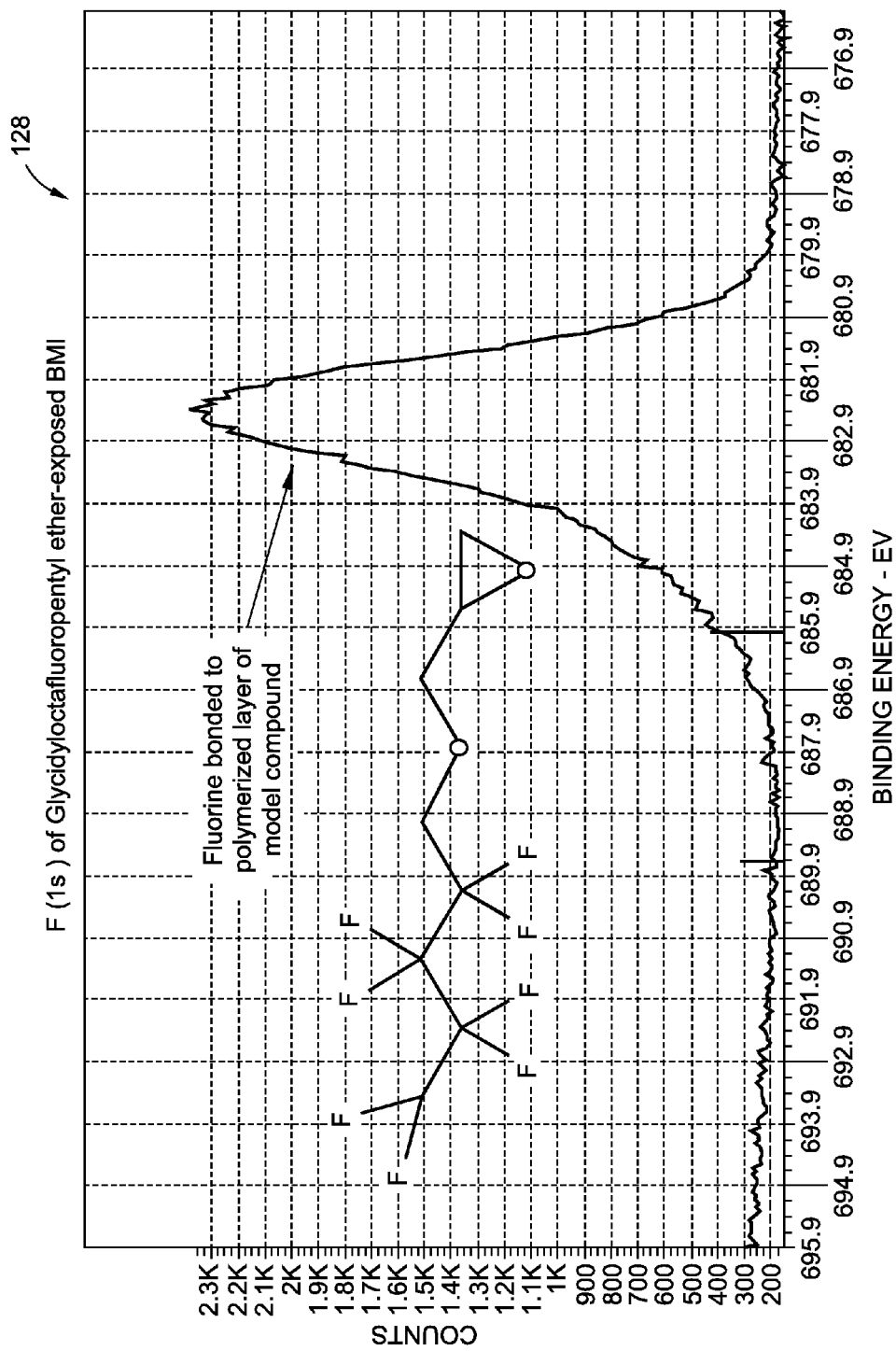
FIG. 17 is an illustration of a graph showing the results of the binding energy of fluorine of glycidyloctafluoropentyl ether to resin and fibers of a derivatized bismaleimide surface.

FIG. 17 is an illustration of a graph 128 showing the results of the binding energy test for F (fluorine) (1 s) of the glycidyloctafluoropentyl ether-exposed BMI sample. The test results showed no polymerization reaction. The glycidyloctafluoropentyl ether derivatization compound is bonded to the functional group on the bismaleimide substrate surface. There was evidence of active BMI surface initiated polymerization of the epoxide group. A thick layer of polymer was chemically bonded to the BMI surface.

CONCLUSIONS

Embodiments of the methods 150, 200, 300 and the bonded structures produced thereby and disclosed herein provide for durable surface modification of the composite surface or metal surface which may result in improved structural bonding and repair as compared to existing methods. Further, embodiments of the methods 150, 200, 300 and the bonded structures produced thereby and disclosed herein eliminate the use of fastener devices to secure the composite structure to the other structure made of the composite, the metal, or the combination thereof, or to repair the portions of the composite structure. In turn, this may reduce overall manufacturing costs and weight of the bonded composite or composite/metal structure by not having to use the fastener devices. Additionally, embodiments of the methods 150, 200, 300 and the bonded structures produced thereby and disclosed herein may enable completely bonded joints for aircraft production and repair which can provide significant weight reduction and structural efficiency by distributing the load to larger surface areas by eliminating the need for fasteners. Cost savings may also be achieved by the reduction of reworking of composite bonded or bolted structural components. Further, embodiments of the methods 150, 200, 300 and the bonded structures produced thereby and disclosed herein produce derivatized composite surfaces as an adhesive promoter for bonded composite and composite/metal joints and repair. Moreover, embodiments of the methods 150, 200, 300 and the bonded structures produced thereby and disclosed herein use molecular functional groups as a durable adhesive promoter that may be grown or activated on the composite or metal surface to assist composite or metal adhesion during structural bonding or repair. Environmentally durable functional groups on the composite structural surface can act as a potential molecular layer-adhesive promoter and thus can improve the adhesion, which accounts for increased structural bonding and repair performance. The resulting bond is intended to have a long durability without degradation and is intended to endure for the design life of an aircraft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of applying a high temperature hybridized molecular functional group adhesion barrier coating to a surface of a structure, the method comprising:
   providing a structure having at least one surface to be bonded;
   preparing the at least one surface to expose active reactive surface sites;
   providing one or more liquid or solid phase chemical derivatization compounds selected from the group consisting of pentafluorophenol, allyl pentafluorobenzene, tridecafluorononyl maleimide, and glycidyl octafluoropentyl ether;
   applying heat to the one or more liquid or solid phase chemical derivatization compounds to vaporize the one or more liquid or solid phase chemical derivatization compounds;
   depositing the one or more vaporized chemical derivatization compounds on the prepared surface to form a derivatized surface having hybridized molecular functional groups comprising one of hydroxyl, maleimide, allyl, and imide; and,
   heat curing the derivatized surface to form a high temperature hybridized molecular functional group adhesion barrier coating.

2. The method of claim 1, wherein the structure is made of a material selected from a group comprising a composite material, a metal material, and a ceramic material.

3. The method of claim 2, wherein the composite material is selected from a group comprising bismaleimides (BMI), epoxies, polyimides, and a combination thereof.

4. The method of claim 2, wherein the metal material is selected from a group comprising super alloys and titanium.

5. The method of claim 1, wherein the surface is prepared with one or more surface preparation treatments selected from a group comprising hand sanding, machine sanding, sandblasting, solvent wiping, abrading, grit blasting, chemical cleaning, and chemical etching.

6. The method of claim 1, wherein the one or more vaporized chemical derivatization compounds are deposited via chemical vapor deposition or vacuum deposition.

7. The method of claim 1, wherein the applying heat and heat curing steps are conducted at a temperature in a range of from about 350 degrees Fahrenheit to about 500 degrees Fahrenheit.

8. The method of claim 1, wherein the high temperature hybridized molecular functional group adhesion barrier coating is resistant to high heat temperatures in a range of from about 350 degrees Fahrenheit to about 2000 degrees Fahrenheit.

9. The method of claim 1, wherein the structure is an aircraft structure.

10. The method of claim 1, wherein high temperature hybridized molecular functional group adhesion barrier coating is a thermally protective, toughened adhesion coating that mitigates effects of a hostile operating environment.

11. A method of applying a high temperature hybridized molecular functional group adhesion barrier coating to a surface of a composite structure, the method comprising:
    preparing a composite surface of a composite structure to expose active reactive surface sites;
    positioning the composite structure in a derivatization chamber;
    positioning one or more liquid or solid phase chemical derivatization compounds in the derivatization chamber, the chemical derivatization compounds selected from the group consisting of pentafluorophenol, allyl pentafluorobenzene, tridecafluorononyl maleimide, glycidyl octafluoropentyl ether, and fluorinated compounds;
    sealing the derivatization chamber;
    applying heat to the one or more liquid or solid phase chemical derivatization compounds to vaporize the one or more liquid or solid phase chemical derivatization compounds;
    flowing the one or more vaporized chemical derivatization compounds over the prepared composite surface;
    depositing the one or more vaporized chemical derivatization compounds on the prepared composite surface to form a derivatized composite surface having hybridized molecular functional groups comprising one of hydroxyl, maleimide, allyl, and imide;
    heat curing at an effective curing heat temperature for an effective curing heat time the derivatized composite surface to form a high temperature hybridized molecular functional group adhesion barrier coating; and,
    cooling the derivatized composite surface having the formed high temperature hybridized molecular functional group barrier coating.

12. The method of claim 1, wherein the composite structure is made of a material selected from a group comprising bismaleimides (BMI), epoxies, polyimides, and a combination thereof.

13. The method of claim 11, wherein the one or more liquid or solid phase chemical derivatization compounds is pentafluorophenol.

14. The method of claim 11, wherein the composite surface is prepared with one or more surface preparation treatments selected from a group comprising hand sanding, machine sanding, sandblasting, solvent wiping, abrading, grit blasting, chemical cleaning, and chemical etching.

15. The method of claim 11, wherein the high temperature hybridized molecular functional group adhesion barrier coating is resistant to high heat temperatures in a range of from about 350 degrees Fahrenheit to about 2000 degrees Fahrenheit.

16. The method of claim 11, wherein high temperature hybridized molecular functional group adhesion barrier coating is a thermally protective, toughened adhesion coating that mitigates effects of a hostile operating environment.

* * * * *